United States Patent
D'Eramo et al.

(10) Patent No.: US 11,376,992 B2
(45) Date of Patent: Jul. 5, 2022

(54) AUTOMATED VEHICLE SEATS

(71) Applicant: UATC, LLC, San Francisco, CA (US)

(72) Inventors: Christopher Matthew D'Eramo, Bethel Park, PA (US); Nicolas Bryan Chan, Detroit, MI (US); Janna Urbanski, Dearborn, MI (US)

(73) Assignee: UATC, LLC, Mountain View, CA (US)

( * ) Notice: Subject to any disclaimer, the term of this patent is extended or adjusted under 35 U.S.C. 154(b) by 731 days.

(21) Appl. No.: 16/171,827

(22) Filed: Oct. 26, 2018

(65) Prior Publication Data

US 2020/0047641 A1     Feb. 13, 2020

Related U.S. Application Data

(60) Provisional application No. 62/748,846, filed on Oct. 22, 2018, provisional application No. 62/716,057, filed on Aug. 8, 2018.

(51) Int. Cl.
| | |
|---|---|
| *B60N 2/00* | (2006.01) |
| *B60N 2/06* | (2006.01) |
| *B60N 2/14* | (2006.01) |
| *B60N 3/00* | (2006.01) |
| *B60N 2/02* | (2006.01) |
| *B60N 2/01* | (2006.01) |
| *A47C 3/04* | (2006.01) |

(52) U.S. Cl.
CPC .................. *B60N 2/01* (2013.01); *A47C 3/04* (2013.01); *B60N 2/002* (2013.01); *B60N 2/0248* (2013.01); *B60N 2/0252* (2013.01); *B60N 2/06* (2013.01); *B60N 2/14* (2013.01); *B60N 3/001* (2013.01); *B60N 2002/0256* (2013.01); *B60N 2002/0268* (2013.01)

(58) Field of Classification Search
CPC .................................... B60N 2/01; B60N 2/02
See application file for complete search history.

(56) References Cited

U.S. PATENT DOCUMENTS

| | | | |
|---|---|---|---|
| 1,758,826 | A | 5/1930 | Dellert |
| 1,911,224 | A | 5/1933 | Dellert |
| 2,132,279 | A | 10/1938 | Wicknick et al. |

(Continued)

FOREIGN PATENT DOCUMENTS

| | | |
|---|---|---|
| CN | 203623483 | 6/2014 |
| CN | 105189313 | 12/2015 |

(Continued)

*Primary Examiner* — Peter D Nolan
*Assistant Examiner* — Demetra R Smith-Stewart
(74) *Attorney, Agent, or Firm* — Dority & Manning, P.A.

(57) ABSTRACT

Systems, methods, tangible non-transitory computer-readable media, and devices associated with the operation of a vehicle are provided. For example a vehicle computing system can receive occupancy data that includes information associated with occupancy of a vehicle that includes seats. One or more states of the vehicle can be determined. The states of the vehicle can include a disposition of any object that is within the vehicle. Further, a configuration of the seats in the vehicle can be determined based on the occupancy data and the states of the vehicle. The configuration can include a disposition of the seats inside the vehicle. Furthermore, at least one of the seats can be adjusted based on the configuration that was determined.

20 Claims, 12 Drawing Sheets

(56) References Cited

U.S. PATENT DOCUMENTS

| | | | |
|---|---|---|---|
| 2,563,347 A | 8/1951 | Long | |
| 2,642,119 A | 6/1953 | Dary | |
| 3,463,539 A | 8/1969 | Racine et al. | |
| 3,632,161 A | 1/1972 | Arfaras et al. | |
| 3,637,253 A | 1/1972 | Maule et al. | |
| 5,653,262 A | 8/1997 | Hanemaayer | |
| 5,738,408 A | 4/1998 | Wu | |
| 6,030,037 A | 2/2000 | Ritch et al. | |
| 6,264,261 B1 | 7/2001 | Krafcik | |
| 6,338,518 B1 | 1/2002 | D'Annunzio et al. | |
| 6,350,972 B1 | 2/2002 | Wright et al. | |
| 6,540,279 B1 | 3/2003 | Bargiel | |
| 6,925,679 B2 | 8/2005 | Wallach et al. | |
| 7,066,519 B2 | 6/2006 | Rhodes et al. | |
| 7,090,274 B1 | 8/2006 | Khan et al. | |
| 7,156,442 B2 | 1/2007 | McManus et al. | |
| 8,010,230 B2 | 8/2011 | Zini et al. | |
| 8,182,016 B2 | 5/2012 | Kaip et al. | |
| 8,186,735 B2 | 5/2012 | Maceri et al. | |
| 9,256,852 B1 | 2/2016 | Myllymaki | |
| 9,463,715 B1* | 10/2016 | Rawlinson | B60N 2/0742 |
| 9,510,682 B2 | 12/2016 | Hasegawa et al. | |
| 9,533,625 B2 | 1/2017 | Krishnan et al. | |
| 9,815,388 B1* | 11/2017 | Lindsay | B60N 2/0276 |
| 10,040,373 B2* | 8/2018 | Rawlinson | B60N 2/06 |
| 10,611,269 B1* | 4/2020 | Larner | B60N 2/14 |
| 10,730,407 B2* | 8/2020 | Guy | B60N 2/0715 |
| 2005/0028543 A1 | 2/2005 | Whitehead et al. | |
| 2006/0103174 A1* | 5/2006 | Queveau | B60N 2/3065 297/15 |
| 2007/0156540 A1 | 7/2007 | Koren et al. | |
| 2008/0185893 A1 | 8/2008 | Behrens et al. | |
| 2010/0052374 A1 | 3/2010 | Bell et al. | |
| 2015/0006005 A1 | 1/2015 | Yu et al. | |
| 2015/0379468 A1 | 12/2015 | Danaher | |
| 2016/0280095 A1 | 9/2016 | Frye et al. | |
| 2017/0354996 A1 | 2/2017 | Lim et al. | |
| 2017/0166173 A1 | 6/2017 | Lauffer et al. | |
| 2018/0079278 A1 | 3/2018 | Kirpichnikov et al. | |
| 2018/0141468 A1* | 5/2018 | Goto | B60N 2/0705 |
| 2018/0356897 A1* | 12/2018 | Hoggarth | B60N 2/02 |
| 2019/0126786 A1* | 5/2019 | Dry | B60R 16/037 |
| 2019/0303729 A1* | 10/2019 | Gramenos | G06K 9/00832 |
| 2020/0047641 A1* | 2/2020 | D'Eramo | B60N 2/14 |

FOREIGN PATENT DOCUMENTS

| | | |
|---|---|---|
| DE | 4200476 | 7/1993 |
| DE | 19822694 | 11/1999 |
| DE | 102010055365 | 7/2011 |
| EP | 1247473 | 10/2002 |
| EP | 2258579 | 8/2010 |
| FR | 2920011 | 2/2009 |
| JP | 6270307 | 12/2013 |
| JP | 6262937 | 1/2014 |
| KR | 100783510 | 6/2007 |
| WO | WO2012060462 | 5/2012 |
| WO | WO2017156586 | 9/2017 |

* cited by examiner

AUTOMATED VEHICLE SEATS

RELATED APPLICATIONS

The present application is based on and claims benefit of U.S. Provisional Patent Application No. 62/748,846 having a filing date of Oct. 22, 2018 and U.S. Provisional Patent Application No. 62/716,057 having a filing date of Aug. 8, 2018, which are incorporated by reference herein.

FIELD

The present disclosure relates generally to configurable, nestling seats, and seat interfaces for vehicles.

BACKGROUND

Vehicles, including autonomous vehicles, are often equipped with a variety of vehicle control systems that are used to perform various functions. The vehicle control systems can be used in conjunction with a variety of components that facilitate performance of these functions by the autonomous vehicle. However, the functions an autonomous vehicle is expected to perform can change over time. As such, there exists a need for an autonomous vehicle that is able to more effectively perform those functions by adapting the autonomous vehicle to better meet the demands placed on the autonomous vehicle by its users.

SUMMARY

Aspects and advantages of embodiments of the present disclosure will be set forth in part in the following description, or may be learned from the description, or may be learned through practice of the embodiments.

An example aspect of the present disclosure is directed to a vehicle including: one or more seats; one or more processors; a memory including one or more computer-readable media, the memory storing computer-readable instructions that when executed by the one or more processors cause the one or more processors to perform operations. The operations can include receiving occupancy data including information associated with occupancy of a vehicle. The operations can also include determining one or more states of the vehicle. The one or more states of the vehicle can include a disposition of any object within the vehicle. Further, the operations can include determining a configuration of the one or more seats based at least in part on the occupancy data and the one or more states of the vehicle. The configuration can include a disposition of the one or more seats inside the vehicle. Furthermore, the operations can include adjusting at least one seat of the one or more seats based at least in part on the configuration.

Another example aspect of the present disclosure is directed to a computer-implemented method of operating a vehicle. The computer-implemented method can include receiving, by a computing system including one or more computing devices, occupancy data including information associated with occupancy of a vehicle. Further, the vehicle can include one or more seats. The computer-implemented method can also include determining, by the computing system, one or more states of the vehicle. The one or more states of the vehicle can include a disposition of any object within the vehicle. The computer-implemented method can include determining, by the computing system, a configuration of the one or more seats based at least in part on the occupancy data and the one or more states of the vehicle. The configuration can include a disposition of the one or more seats inside the vehicle. Furthermore, the computer-implemented method can include adjusting at least one seat of the one or more seats based at least in part on the configuration.

Another example aspect of the present disclosure is directed to a computing device including: one or more processors; a memory including one or more computer-readable media, the memory storing computer-readable instructions that when executed by the one or more processors cause the one or more processors to perform operations. The operations can include receiving occupancy data including information associated with occupancy of a vehicle. Further, the vehicle can include one or more seats. The operations can also include determining one or more states of the vehicle. The one or more states of the vehicle can include a disposition of any object within the vehicle. Further, the operations can include determining a configuration of the one or more seats based at least in part on the occupancy data and the one or more states of the vehicle. The configuration can include a disposition of the one or more seats inside the vehicle. Furthermore, the operations can include adjusting at least one seat of the one or more seats based at least in part on the configuration.

Other example aspects of the present disclosure are directed to other systems, methods, vehicles, apparatuses, tangible non-transitory computer-readable media, and devices for operating a vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
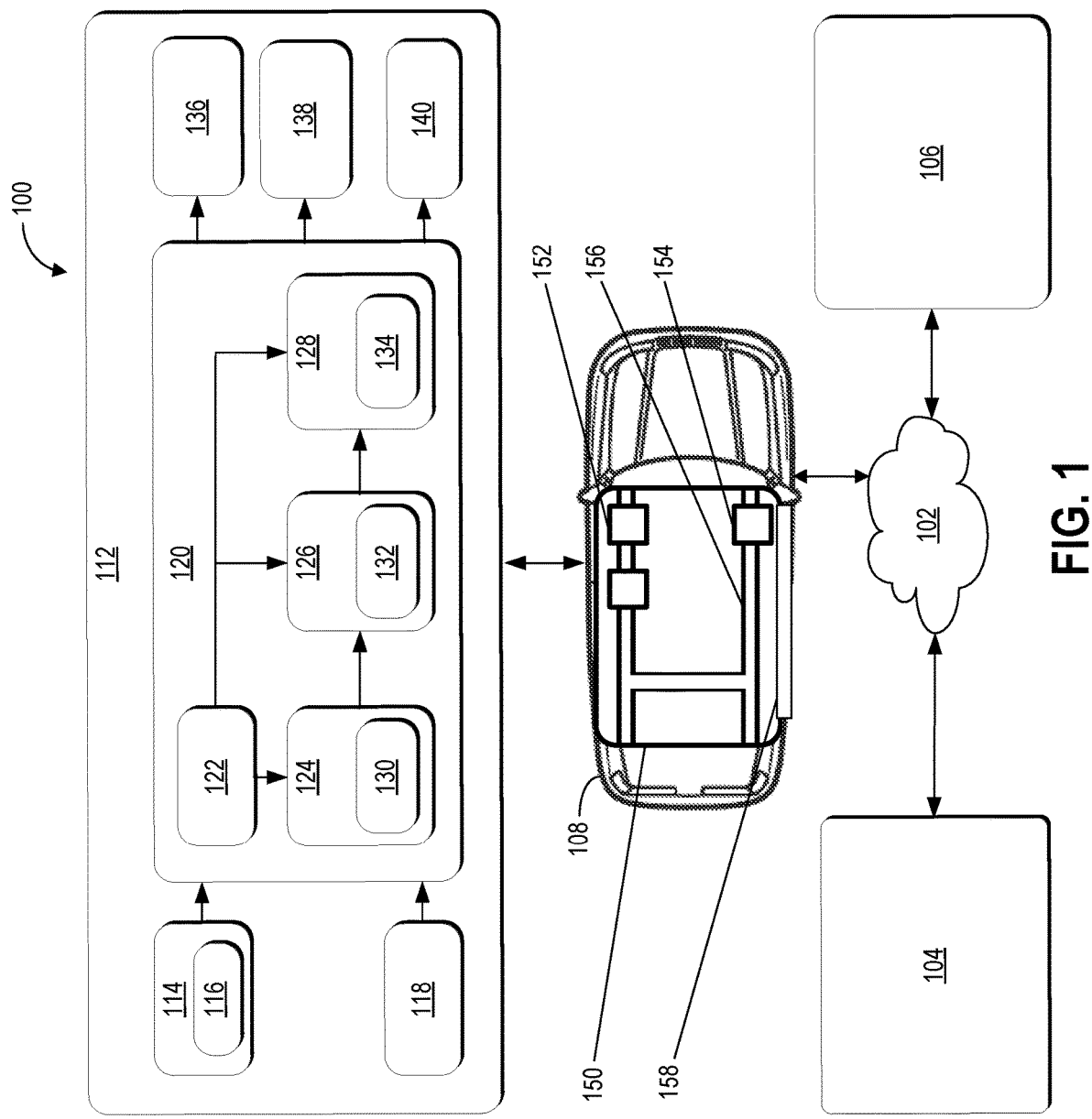
FIG. 1 depicts a diagram of an example system according to example embodiments of the present disclosure.

Example aspects of the present disclosure are directed to a system for configuring seats of a vehicle which can include an autonomous vehicle, a semi-autonomous vehicle, or a manually operated vehicle. The system of configuring seats can perform various functions and/or operations including effectively accommodating passengers and/or cargo through use of an adjustable vehicle interior that includes seats that can change location and/or position. According to example embodiments, configuring seats of a vehicle can include grouping seats of a vehicle. In particular, aspects of the present disclosure include a device that can receive occupancy data including information associated with occupancy of a vehicle (e.g., occupancy of the interior of the vehicle) that includes seats; determine states of the vehicle including the disposition of any objects in the vehicle (e.g., passengers and/or cargo); determine, based on the occupancy data and the states of the vehicle, a configuration of the seats including a disposition of the seats; and adjusting at least one seat based on the configuration.

By way of example, a computing system (e.g., a computing system including one or more computing devices configured to control seats in the interior of a vehicle) associated with one or more seats (e.g., seats that can be used to carry passengers and/or articles of cargo) of a vehicle can receive occupancy data from a remote computing system via one or more wireless signals. The occupancy data can include information associated with a number of passengers that will enter the vehicle, the size and type of cargo that will be loaded into the vehicle, and a desired layout for the interior of the vehicle. The computing system can then perform operations associated with determining the state of the vehicle (e.g., how many passengers or articles of cargo are currently in the vehicle and/or where are the seats currently located). Consider an example in which the vehicle is vacant and the occupancy data indicates that six passengers will be entering the vehicle. Further consider that the occupancy data indicates that the six passengers desire a conference style layout for the vehicle. The computing system can determine that the vehicle is vacant and that a configuration for the conference style layout will include rotating the seats in the vehicle to face the center portion of the vehicle's interior. The computing system can then generate control signals that are used by motors of the vehicle to adjust (e.g., rotate) the seats in the vehicle in accordance with the configuration. Accordingly, the disclosed technology allows for a variety of benefits including greater flexibility in seating arrangements and an improvement in the efficiency with which the interior space of a vehicle is used.

The disclosed technology can include a vehicle configuration system associated with a computing system (e.g., one or more computing devices that includes one or more processors and a memory) that can process, generate, send, and/or receive signals or data, including signals or data exchanged with various devices including one or more vehicles, vehicle components (e.g., one or more seats, a seat interface, one or more motors, brakes, a steering device, and/or a transmission device), and/or remote computing devices (e.g., one or more vehicles, smart phones, laptop computing devices, tablet computing devices, and/or wearable devices).

For example, the vehicle configuration system can be associated with a computing system that can exchange one or more signals (e.g., electronic signals) and/or data with one or more vehicle systems including one or more seats of a vehicle (e.g., seats that can change location and/or position within a vehicle), a seat interface (e.g., an interface to enable movement of seats that can include rails, tracks, and/or magnetic attachments), vehicle access systems (e.g., one or more locking mechanisms associated with the one or more seats and/or the vehicle); illumination systems (e.g., headlights, internal lights, signal lights, and/or tail lights); sensor systems that can generate output based on the state of the vehicle and/or the physical environment external to the vehicle and which can include one or more LIDAR devices, cameras, tactile sensors, microphones, radar devices, and/or sonar devices; communication systems (e.g., wired or wireless communication systems that can exchange signals or data with other devices including various vehicles); navigation systems (e.g., devices that can receive signals from GPS, GLONASS, or other systems used to determine a vehicle's geographical location); notification systems (e.g., devices used to provide notifications including one or more display devices, status indicator lights, and/or audio output systems); braking systems (e.g., brakes of the vehicle including mechanical and/or electric brakes); propulsion systems (e.g., motors and/or engines including internal combustion engines or electric engines); and/or steering systems used to change the trajectory, path, course, and/or direction of travel of the vehicle.

The vehicle configuration system can receive occupancy data including information associated with occupancy of a vehicle that can include one or more seats. For example, the vehicle configuration system can, via a wireless and/or wired connection, receive occupancy data from one or more remote computing devices (e.g., smartphones and/or server computing devices associated with assigning passengers or cargo to the vehicle). By way of further example, the vehicle configuration system can include an input device (e.g., a touchscreen display panel) that can display various seat configurations (or options to create a seat configuration) to a user of the vehicle configuration system. The user can then select or create a desired vehicle configuration by providing one or more inputs to the input device. The user input can be used to generate occupancy data that will be sent to a computing portion of the vehicle configuration system for later use.

In some embodiments, the occupancy data can be associated with information including a number of passengers that will occupy the one or more seats, the assignment of one or more passengers to the one or more seats of the vehicle, and/or an amount of cargo that will occupy the vehicle. For example, the occupancy data can indicate that three passengers and two articles of cargo (e.g., two cubic boxes measuring half a meter per side and with a mass of twenty kilograms) will be entering the vehicle. Furthermore, the occupancy data can include one or more personal preferences of passengers including requested seating locations within the vehicle (e.g., window seats, seats towards the rear portion of the vehicle, and/or seats towards the front of the vehicle). By way of further example, the occupancy data can indicate the seats in which each of one or more passengers of the vehicle is assigned to be seated.

In some embodiments, the occupancy data can include information associated with one or more seat configurations of the seat associated with a passenger. Further, the one or more seat configurations can include a seat height, a seat headrest height, a seat back angle, and/or an accessibility status (e.g., an accessibility status indicating the suitability of a seat for use by an individual with a physical impairment or needing assistance in entering and/or exiting the vehicle). For example, the one or more seat configurations can include a higher seat height for use by a taller individual, a lower seat height for children, and/or various seat back angles in accordance with a passenger's seating preferences.

In some embodiments, the vehicle can include a seat interface to which the one or more seats are connected. Further, the seat interface can be configured to enable movement of the one or more seats to one or more different locations in the vehicle. Further, the seat interface can include one or more tracks, one or more rails, and/or one or more magnetic regions that attract one or more ferromagnetic portions of the one or more seats. For example, the one or more seats can move along one or more rails of the seat interface, allowing the one or more seats to be located at different portions of the vehicle's interior.

Furthermore, each of the one or more seats can be attachable to the seat interface and/or detachable from the seat interface. For example, each of the one or more seats can be attached and/or detached to the vehicle (e.g., the interior of the vehicle which can include a seat interface) using one or more locking devices or joining devices including one or more clasps, one or more latches, one or more grooves (e.g., grooves in the floor or walls of the vehicle interior that can hold protrusions from the one or more seats), and/or one or more indentations (e.g., indentations in the floor or walls of the vehicle interior that can securely contain protrusions from the one or more seats).

In some embodiments, at least one of the one or more seats can be configured to be grouped with at least one other seat of the one or more seats. Grouping can include nesting, nestling, stacking, and/or fitting together the at least one seat to at least one other seat of the one or more seats. For example, each of the one or more seats can be shaped to fit together with the other seats. By way of further example, the one or more seats can be shaped so that when seats are grouped together most of the back portion of a seat will be in contact with the front portion of the seat to which it is grouped. Furthermore, the one or more seats can be configured so that a portion of a seat can slide onto the top portion of another seat when the seats are brought together. For example, the bottom portion of a seat (e.g., the part of the seat a passenger sits on) can lift upwards and onto the top of the bottom portion of a seat behind it, thereby stacking one seat on top of another seat.

In some embodiments, the vehicle can include at least one entrance into the vehicle. For example, the at least one entrance into the vehicle can include one or more doors, one or more windows, one or more cargo areas (e.g., a trunk). Further, the at least one entrance into the vehicle can be configured to open, close, lock, and/or unlock.

In some embodiments, each of the one or more seats can include one or more portions that fold, collapse, retract, and/or extend. For example, a lower seating portion of a seat can be folded upwards, which can allow for more compact grouping of the one or more seats that creates more horizontal space inside the vehicle. By way of further example, a portion of a seat can be retracted from an armrest of the seat and folded down to form a table for the occupant of the seat.

In some embodiments, the one or more seats can include one or more barriers configured to reduce access to the at least one seat. For example, a seat can include a barrier that retracts upwards from both the left and right armrests of the seat to the ceiling of the interior of the vehicle, thereby reducing access to the seat from other seats to the left and right of the seat. By way of further example, the one or more barriers can include one or more fabric barriers (e.g., cotton or nylon barriers), one or more transparent barriers (e.g., clear glass or clear plastic barriers), soft barriers (e.g., barriers made from a cushioned material), and/or one or more hard barriers (e.g., barriers made from hard plastic, wood, and/or metal).

The vehicle configuration system can determine one or more states of the vehicle. The one or more states of the vehicle can include a disposition (e.g., the location, position, orientation, and/or way in which an object is arranged with respect to other objects or the vehicle) of any object within the vehicle. For example, the vehicle configuration system can receive one or more sensor outputs from one or more sensors of the vehicle (e.g., one or more cameras, radar, sonar, and/or pressure sensors) that can detect objects in the vehicle. The vehicle configuration system can use the one or more sensor outputs to determine the disposition of objects in the vehicle (e.g., the amount of passengers or cargo in the vehicle and/or the location of the one or more seats in the vehicle). By way of further example, the vehicle configuration system can determine the location and position of the one or more seats based at least in part on one or more signals or data indicating the disposition of the one or more seats (e.g., the vehicle configuration system can poll the one or more seats and, in response, receive data indicating the seat disposition from each of the one or more seats).

The vehicle configuration system can determine a configuration of the one or more seats based at least in part on the occupancy data and the one or more states of the vehicle. The configuration can include a disposition of the one or more seats inside the vehicle. Further, the configuration can include a location of each of the one or more seats with respect to the seat interface, the other seats of the one or more seats, or some other point of reference within the vehicle. By way of example, the configuration can indicate, with respect to the seat interface, the one or more seats that are grouped, the location of the one or more seats that are grouped, and/or the location of the one or more seats that are not grouped. By way of further example, the configuration of the one or more seats on a seat interface that includes one or more tracks can include the position of each seat along each of the one or more tracks.

Furthermore, in some embodiments, the configuration of the one or more seats can include a location of each of the one or more seats in the vehicle, an orientation of each of the one or more seats with respect to the vehicle, and/or a seating position of each of the one or more seats. For example, the location of each of the one or more seats can include a set of Cartesian coordinates with respect to the floor of the vehicle interior and/or a row and side (e.g., the second row on the left side of the vehicle).

In some embodiments, each of the one or more seats can include one or more passenger facing portions and one or more non-passenger facing portions. The one or more passenger facing portions of the one or more seats can include the portions of each seat that a passenger will be seated on (e.g., the upholstered portions of the seat that the passenger will come into contact with) and/or come into contact with (e.g., the rear seatback portion of a seat that includes a display device including a flat panel display that is part of an in-vehicle entertainment system). By way of example, the materials included in each of the one or more passenger facing portions can include leather (e.g., genuine leather and/or synthetic leather), smooth plastics, soft-touch plastics, and/or fabric (e.g., any combination of wool, cotton, nylon, and/or silk) portions of a seat that the passenger will sit on or come into contact with. Further, the one or more passenger facing portions of the seat can be configured using various designs (e.g., patterns and/or pictures), textures, padded portions (e.g., cushioning to improve passenger comfort), and/or colors that are more ergonomic and/or aesthetically pleasing.

Further, the one or more non-passenger facing portions can include the portions of the seat that a passenger will not be seated on (e.g., the underside portion of a seat) and/or come into contact with (e.g., the portions of a seat that passenger will not come into contact with in the regular course of using the seat). The one or more non-passenger facing portions of the seat can include any portions of a seat that include exposed screws, exposed nuts, exposed bolts, sharp edges, rough edges, coarse surfaces, lubricant, bare electronics, and/or wiring. Further, the one or more non-passenger facing portions of the seat can include surfaces (e.g., metal, plastic, glass, and/or wood) that are in an unfinished state (e.g., unpainted, unvarnished, and/or not sanded to a smooth finish).

In some embodiments, the vehicle computing system can determine, based at least in part on the occupancy data, one or more portions of the one or more seats that will be visible to one or more passengers of the vehicle. The occupancy data can include a seating assignment for the one or more passengers that can be used to determine the portions of the vehicle (e.g., the interior of the vehicle) including the one or more portions of the one or more seats that will be visible to the one or more passengers. For example, based at least in part on the seating assignment from the occupancy data, the one or more portions of the one or more seats that will be visible to the one or more passengers can include the one or more portions of the one or more seats that are in front of or adjacent to a seat assigned to a passenger.

In some embodiments, the vehicle configuration system can determine that only the one or more passenger facing portions of each of the one or more seats will be visible (e.g., in front of a passenger or in a passenger's line of sight) to one or more passengers of the vehicle. By way of example, the one or more seats of the vehicle can include one or more seats with a bottom portion that, when folded upwards, exposes a non-passenger facing underside portion of the seat that includes a tangle of wiring and bare electronics. Further, the occupancy data can include a number of passengers and/or the seating assignment for passengers that will enter the vehicle. The vehicle configuration system can then determine the one or more portions of the one or more seats that will be visible to one or more passengers of the vehicle. The vehicle configuration system can determine that when the bottom portion of a seat that will not be occupied by a passenger is folded upwards (making the wiring and bare electronics visible to seated passengers) to provide more room for passengers, that the non-passenger facing bottom portion of the seat will face towards the walls of the vehicle and away from passengers inside the vehicle. In this way, passengers can enjoy greater comfort by not being exposed to unsightly and potentially rough portions of the seats.

In some embodiments, the vehicle configuration system can generate one or more control signals and/or data to control the one or more seats based at least in part on the configuration. For example, the vehicle configuration system can generate one or more control signals (e.g., electronic signals) and/or data associated with performance of one or more operations including controlling movement of the one or more seats and/or controlling movement of the seat interface. For example, the one or more control signals and/or data can be sent to the one or more seats and/or the seat interface to adjust the one or more seats including changing the location and/or position of the one or more seats in the vehicle.

In some embodiments, the occupancy data can include a layout of the one or more seats in the vehicle. For example, the occupancy data can indicate a layout in which three seats of the one or more seats on the left side of the vehicle will be arranged facing forward and that three seats on the right side of the vehicle will be grouped (e.g., nested or nestled) so that the region of the vehicle on the right side of the vehicle can provide space for an individual using a wheelchair.

Furthermore, in some embodiments, the vehicle configuration system can determine one or more locations of the one or more seats with respect to the seat interface based at least in part on the occupancy data including the layout of the one or more seats in the vehicle. For example, the vehicle configuration system can activate one or more motors of the one or more seats and/or the seat interface to position the one or more seats in accordance with the layout.

In some embodiments, the occupancy data can include an order in which one or more passengers or cargo will enter or exit the vehicle. For example, the occupancy data can indicate that three passengers, Anand, Bethany, and Carlos will exit the vehicle starting with Anand and ending with Carlos.

In some embodiments, the vehicle configuration system can determine one or more locations of the one or more seats in the vehicle based at least in part on the order in which the one or more passengers or cargo will enter and/or exit the vehicle. For example, the vehicle configuration system can determine that the one or more seats on the left side of the vehicle will be grouped to allow a first set of passengers easier access to the one or more seats on the right side of the vehicle. The vehicle configuration system can then ungroup the one or more seats on the left side of the vehicle so that a second set of passengers can sit in the seats.

In some embodiments, the vehicle configuration system can determine that the one or more passengers and/or cargo that will exit the vehicle earlier are assigned to the one or more seats in greater proximity to the at least one entrance than the one or more passengers or cargo that will exit the vehicle later. For example, when three passengers Anand, Bethany, and Carlos will exit a vehicle with two entrances, in an order starting with Anand and ending with Carlos, Anand can be assigned to a seat closest to the entrance on the left side of the vehicle, Bethany can be assigned to a seat closest to the entrance on the right side of the vehicle, and Carlos can be seated further away from either entrance than Anand or Bethany.

The vehicle configuration system can generate, based at least in part on the configuration (e.g., one or more control signals and/or data associated with the configuration), one or more seating indications associated with a seating status of each of the one or more seats. Further, the one or more seating indications including one or more visual indications, one or more audible indications, and/or one or more haptic indications. For example, the one or more seating indications can include various indications that can be used to indicate the state of a seat (e.g., available or unavailable), indicate a seat identifier (e.g., a seat number assigned to a particular passenger), and/or a message (e.g., "PLACE ANY BAGGAGE UNDER THE SEAT").

In some embodiments the one or more visual indications can be displayed on one or more areas of the one or more seats. Further, the one or more visual indications can include illumination of the one or more areas of the one or more seats, one or more textual messages displayed on the one or more areas of the one or more seats, and/or one or more colors displayed on the one or more areas of the one or more seats. For example, the one or more visual indications can include illuminating a green light (e.g., a green colored LED) on a display area of a seat to indicate that the seat is available or illuminating a red light (e.g., a red colored LED) on a display area of the seat to indicate that the seat is not available (e.g., the seat is reserved for a passenger that will enter the vehicle at a later time).

The vehicle configuration system can adjust at least one seat of the one or more seats based at least in part on the configuration. Adjusting the at least one seat of the one or more seats can include adjusting a location, an orientation, and/or a seating position of at least one seat of the one or more seats. Further, the seating position can include a height of the at least one seat with respect to the vehicle (e.g., a height of a seat bottom portion of the seat with respect to the floor of the interior of the vehicle), an angle of a seat back portion of the at least one seat (e.g., an angle to which the seat back portion of the seat is reclined), a height of an armrest portion of the at least one seat, and/or a height of a headrest portion of the at least one seat. For example, one or more control signals and/or data associated with the configuration can be used to activate one or more motors of the seat interface and/or the one or more seats that can move the seats to different locations in the vehicle (e.g., grouping some of the one or more seats and moving the one or more seats to other portions of the vehicle's interior). Further, the one or more control signals and/or data associated with the configuration can be used to adjust the position of each of the one or more seats (e.g., raising, swiveling, and/or lowering a seat).

By way of further example, one or more control signals and/or data associated with the configuration can be used to activate one or more motors that adjust the orientation of the at least one seat from a forward-facing position (e.g., a position facing the vehicle's forward direction of travel) to a side-facing position (e.g., a position that is perpendicular to the forward-facing position). Further, in a vehicle including a plurality of seats, one or more control signals and/or data associated with the configuration can be used to activate one or more motors that adjust a first set of the plurality of seats from the forward-facing position to a side-facing position and adjust a second set of the plurality of seats in a row parallel to the first set of the plurality of seats, to face the first set of the plurality of seats. In this way, the seats in the vehicle can be arranged so that passengers of the seat are facing one another.

In some embodiments, the vehicle configuration system can group at least one seat of the one or more seats to at least one other seat of the one or more seats based at least in part on the configuration. For example, the vehicle configuration system can generate one or more control signals and/or data based at least in part on the configuration. The one or more control signals and/or data can be used to activate one or more motors of the seat interface and/or the one or more seats that can cause a portion (e.g., three of six seats in a vehicle) of the one or more seats to fold a bottom seating area upwards and be grouped together (e.g., brought together) in a rear portion of the vehicle's interior.

In some embodiments, the vehicle configuration system can determine that only the one or more seats that are not occupied will be grouped (e.g., not occupied by a passenger or an article of cargo). Furthermore, the vehicle configuration system can include one or more sensors that can detect the presence of an object (e.g., a passenger and/or an article of cargo) that blocks grouping of any seat of the one or more seats. For example, the motors of the one or more seats and/or seat interface can be configured to stop or reverse movement in a particular direction when any resistance to the movement in that direction is detected. By way of further example, the vehicle computing system can be configured not to adjust the configuration of the one or more seats when any passengers and/or cargo are present in the vehicle (e.g., the vehicle configuration system will only adjust the one or more seats when the vehicle is unoccupied or vacant).

In some embodiments, the occupancy data can include a number of the one or more seats that will be occupied (e.g., a number of the one or more seats that will be occupied by passengers). Further, the vehicle configuration system can group the one or more seats that will not be occupied. For example, in a vehicle with six seats, when the occupancy data indicates that two seats will be occupied, the vehicle configuration system can group the four seats that will not be occupied. In this way, the passengers of the vehicle can enjoy a greater amount of free space around their respective seats.

The systems, methods, devices, and non-transitory computer-readable media in the disclosed technology can provide a variety of technical effects and benefits to the overall operation of a vehicle including more effective use of a vehicle's interior space, improved distribution of passengers or cargo during transport, more effective ingress into and egress from the vehicle, and improved passenger safety during transit.

For example, the ability to configure the interior layout of the interior of a vehicle can result in more varied use of the interior of a vehicle. For example, seats in the interior of the vehicle can be positioned so that passengers face the same direction of travel when the vehicle is in transit and face one another when the vehicle is stationary. Furthermore, unused seats in the interior of the vehicle can be fitted together, which creates greater space for remaining passengers or cargo.

The disclosed technology can also improve the operation of the vehicle by configuring the interior of the vehicle so that passengers and cargo are better distributed throughout the interior of the vehicle. For example, by selecting stacking and repositioning seats, the interior of the vehicle can be configured in a way that reduces the shifting of cargo in transit. In this way, flexible configuration of the interior of a vehicle allows for more effective carrying and transportation of passengers and cargo.

Additionally, configurable seats can facilitate entering and exiting the vehicle. For example, when passengers exit the vehicle, the seats vacated by the passengers can be fitted together to make exiting the vehicle easier for the remaining passengers. Further, the configurability of the seats in the vehicle allows for greater accessibility to wheel-chair users since the interior of the vehicle can be configured to accommodate wheel-chairs and facilitate easier entry and exit for wheel-chair users.

Furthermore, the disclosed technology can improve the safety of passengers or cargo inside the vehicle through more effective configuration of seats in the interior of the vehicle. For example, the disclosed technology can improve operation of the vehicle by configuring the interior of the vehicle so that cargo and passengers are in separate parts of the vehicle interior. As such, passengers and cargo are less likely to be involved in adverse interactions.

Additionally, the automatic configuration of vehicle seats based on occupancy data can increase the efficiency of vehicle services. The automatic configuration of the vehicle seats using on-board motors can reduce inefficiencies associated with human-based performance of these operations. Moreover, the automatic configuration of seats can be performed based on occupancy data indicating a desired configuration of the vehicle. The occupancy data can be received from a remote computing device including a vehicle service operator. In this manner, the vehicle can automatically be configured prior to passengers or cargo entering the vehicle. For example, the seats of a vehicle can be configured while the vehicle is in transit to begin performance of a vehicle service.

Accordingly, the disclosed technology provides more effective configuration of a vehicle's compartments along with operational benefits including improved use of a vehicle's interior space, improved distribution of passengers or cargo, more effective ingress into and egress from the vehicle, and improved passenger safety.

Various means can be configured to perform the methods and processes described herein. For example, a computing system can include one or more data receiving units, one or more vehicle state determination units, one or more configuration determination units, one or more control signal generation units, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, including random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a vehicle configuration system) or configured (e.g., an ASIC custom designed and configured to operate a vehicle configuration system) to perform one or more algorithms for performing the operations and functions described herein. For example, the means can be configured to receive occupancy data that includes information associated with occupancy of a vehicle that has an interior including one or more seats. An occupancy data receiving unit is an example of a means for receiving such data as described herein.

Furthermore, the means can be configured to determine one or more states of a vehicle (e.g., the interior of a vehicle that can include one or more seats and/or a seat interface). A vehicle state determination unit is an example of a means for determining such states as described herein.

Furthermore, the means can be configured to determine a configuration of one or more seats based at least in part on occupancy data and one or more states of the vehicle. In some implementations, the means can be configured to determine one or more locations of the one or more seats with respect to a seat interface. Further, in some implementations, the means can be configured to determine one or more locations of the one or more seats in the vehicle based at least in part on the order in which the one or more passengers or cargo will enter or exit the vehicle. In some implementations, the means can also be configured to determine that the one or more passengers or cargo that will exit the interior of the vehicle earlier are assigned to the one or more seats in greater proximity to the at least one entrance than the one or more passengers or cargo that will exit the interior of the vehicle later. A configuration determination unit is an example of a means for determining such a configuration as described herein.

Furthermore, the means can be configured to generate one or more control signals to adjust the one or more states of the interior of the vehicle based at least in part on the configuration. A control signal generation unit is an example of a means for generating such signals as described herein.

Further, in some implementations the means can be configured to generate one or more seating indications associated with a seating status of each of the one or more seats based at least in part on the configuration. An indication generation unit is an example of a means for determining such data as described herein.

Furthermore, the means can be configured to adjust one or more seats based at least in part on the configuration. A seat adjustment unit is an example of a means for determining such data as described herein.

With reference now to FIGS. 1-12, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; a vehicle cabin 150, a seat 152, a seat 154, and a seat interface 156.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform operations and/or functions associated with operation of a vehicle including receiving occupancy data including information associated with occupancy of a vehicle (e.g., the vehicle 108) that includes one or more seats (e.g., the one or more seats 152/154); determining one or more states of the vehicle in which the one or more states of the vehicle can include a disposition of any object within the vehicle; determining a configuration of the one or more seats based at least in part on the occupancy data and the one or more states of the vehicle, in which the configuration can include a disposition of the one or more seats inside the vehicle; adjusting at least one seat of the one or more seats based at least in part on the configuration, and/or any other operations and/or functions for operation of a vehicle, as described in the present disclosure.

For example, the operations computing system 104 can be configured to monitor and communicate with the vehicle 108 and/or its users to coordinate a vehicle service provided by the vehicle 108. To do so, the operations computing system 104 can manage a database that includes data including vehicle status data associated with the status of vehicles including the vehicle 108; passenger status data associated with the status of passengers of the vehicle; and/or cargo status data associated with the status of cargo in the vehicle. The vehicle status data can include a location of a vehicle (e.g., a latitude and longitude of a vehicle), the availability of a vehicle (e.g., whether a vehicle is available to pick-up or drop-off passengers and/or cargo), the state of one or more objects in the vehicle (e.g., the state of one or more passengers and/or cargo), or the state of objects external to a vehicle (e.g., the physical dimensions and/or appearance of objects external to the vehicle). The passenger status data can include one or more states of passengers of the vehicle including one or more locations of one or more passengers. The cargo status data can include information associated with one or more states of cargo inside the vehicle include cargo identifiers (e.g., a type of cargo or a name associated with cargo), cargo dimensions (e.g., physical dimensions of cargo including length, width, and height), and/or the mass of cargo (e.g., a mass of cargo in kilograms).

The operations computing system 104 can communicate with the one or more remote computing devices 106 and/or the vehicle 108 via one or more communications networks including the communications network 102. The communications network 102 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including exchanging (e.g., sending and/or receiving) data or signals with the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 via the communications network 102. Furthermore, in some embodiments, the one or more remote computing devices can perform one or more operations (e.g., remotely performing one or more operations on the vehicle 108 via the communications network 102) including receiving occupancy data including information associated with occupancy of a vehicle (e.g., the vehicle 108) that includes one or more seats (e.g., the one or more seats 152/154); determining one or more states of the vehicle in which the one or more states of the vehicle can include a disposition of any object within the vehicle; determining a configuration of the one or more seats based at least in part on the occupancy data and the one or more states of the vehicle, in which the configuration can include a disposition of the one or more seats inside the vehicle; and/or adjusting at least one seat of the one or more seats based at least in part on the configuration.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 and/or the one or more seats 152/154 including a location (e.g., a latitude, longitude, and altitude of the vehicle 108 and/or a seat location of the one or more seats 152/154 within the vehicle cabin 150), a velocity, acceleration, a trajectory, and/or a path of the vehicle 108 and/or the one or based in part on signals or data exchanged with the vehicle 108. In some implementations, the operations computing system 104 can include any of the one or more remote computing devices 106.

The vehicle 108 can be a ground-based vehicle (e.g., an automobile or motorcycle), an aircraft (e.g., an airplane or helicopter), a watercraft (e.g., a boat), an amphibious craft (e.g., a hovercraft), a submersible craft (e.g., a submarine), and/or another type of vehicle. In some embodiments, the vehicle 108 can be an autonomous vehicle that can perform various actions including driving, navigating, and/or operating, with minimal and/or no interaction from a human driver. In an autonomous embodiment, the vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, information, record, and/or other data indicative of the state of the vehicle 108, the state of one or more passengers of the vehicle 108, and/or the state of an environment external to the vehicle 108 including one or more objects (e.g., the physical dimensions and/or appearance of the one or more objects) can be stored locally in one or more memory devices of the vehicle 108. Furthermore, the vehicle 108 can provide data indicative of the state of the one or more objects (e.g., physical dimensions and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory computer readable media (e.g., memory devices). The one or more tangible non-transitory computer readable media can store instructions that when executed by the one or more processors cause the vehicle 108 (e.g., its computing system, one or more processors, and other devices in the vehicle 108) to perform operations and/or functions, including those described herein for receiving occupancy data including information associated with occupancy of a vehicle (e.g., the vehicle 108) that includes one or more seats (e.g., the one or more seats 152/154); determining one or more states of the vehicle in which the one or more states of the vehicle can include a disposition of any object within the vehicle; determining a configuration of the one or more seats based at least in part on the occupancy data and the one or more states of the vehicle, in which the configuration can include a disposition of the one or more seats inside the vehicle; and/or adjusting at least one seat of the one or more seats based at least in part on the configuration.

In some embodiments, the occupancy data received by the vehicle computing system 112 can include information associated with a layout of the one or more seats 152/154, a configuration of each of the one or more seats 152/154, an occupancy status of the one or more seats 152/154, a number of passengers, seat assignments for each of one or more passengers, an order of entry for one or more passengers, an order of exit for one or more passengers, an amount of cargo that will occupy the vehicle 108, one or more physical dimensions of each of the one or more articles of cargo, a type of each of the one or more articles of cargo, a user associated with each of the one or more articles of cargo, and/or a mass of each of the one or more articles of cargo.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LIDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LIDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LIDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that can be used to guide the vehicle 108 to a location at which the one or more seats 152/154 will be occupied by one or more objects including passengers and/or cargo. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, and/or signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108. In some embodiments, the one or more human-machine interfaces 140 can be used to display information associated with a configuration, layout, and/or status of the vehicle 108, the vehicle cabin 150, and/or the one or more seats 152/154.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to activate motors in the vehicle 108 to move one or more portions of the one or more seats 152/154 (e.g., group the one or more seats 152/154) or seat interface 156; and/or determine the state of the one or more seats 152/154 (e.g., determine the location of each of the one or more seats 152/154 within the vehicle cabin 150 and/or the occupancy status of each of the one or more seats 152/154 including a passenger assignment to a seat and whether a seat is, or will be, occupied by a passenger or cargo).

By way of further example, the vehicle computing system 112 can activate one or more vehicle systems including the one or more seats 152/154 (e.g., sending one or more control signals to change the configuration of the one or more seats 152/154); the seat interface 156 (e.g., sending one or more control signals to move various portions of the seat interface 156); the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle; and/or steering systems that can change the path, course, and/or direction of travel of the vehicle 108.

The vehicle 108 can include a vehicle cabin 150 that includes an interior portion of the vehicle that can be used to house and/or contain one or more portions of the one or more seats 152/154 and/or the seat interface 156. Further, the vehicle 108 can include the one or more entrances 158 that can be used to access the interior portion of the vehicle cabin 150 (e.g., the interior portion that includes the one or more seats 152/154 and the seat interface 156). The one or more entrances 158 of the vehicle 108 can include one or more doors, one or more windows, one or more trunks, and/or one or more portholes. Further, each of the one or more entrances 158 can include a locking device that can be used to lock the one or more entrances 158 and secure the one or more entrances 158.

The vehicle 108 can include and/or be associated with the one or more seats 152/154 which can include one or more devices that can carry, transport, secure, and/or cover one or more objects including one or more passengers and/or articles of cargo that can be placed and/or positioned in or on the one or more seats 152/154. For example, the one or more seats 152/154 can include one or more chairs, slings, stools, carriages, cradles, and/or other devices on which, or in which, an object can sit and/or be placed. Further, the one or more seats 152/154 can receive one or more signals (e.g., one or more control signals) from the vehicle computing system 112. The one or more signals received from the vehicle computing system 112 can be used to activate one or more motors of the one or more seats 152/154 that can be used to move the one or more seats 152/154 throughout the vehicle cabin 150 including moving the one or more seats 152/154 on the seat interface 156; adjusting some portion of the one or more seats 152/154 including raising, lowering, swiveling, folding, collapsing, retracting, and/or extending some portion of the one or more seats 152/154. The one or more seats 152/154 can be grouped (e.g., brought together within the vehicle cabin 150), detachable from the seat interface 156, and/or attachable to the seat interface 156. In some embodiments, the one or more seats 152/154 can include one or more indicators (e.g., visual indicators and/or audible indicators) that can indicate the one or more states of the one or more seats 152/154.

In some embodiments one or more states of each of the one or more seats 152/154 can include one or more of an available state (e.g., a state in which the one or more seats 152/154 are available to carry one or more objects), unavailable (e.g., a state in which at least one of the one or more seats 152/154 is not available to carry one or more objects), an occupied state (e.g., a state in which the one or more seats 152/154 are occupied by one or more objects), and/or an unoccupied state (e.g., a state in which the one or more seats 152/154 are not occupied by one or more objects).

The vehicle 108 can include the seat interface 156. The seat interface 156 can be configured to move the one or more seats 152/154 inside the vehicle cabin 150 and/or serve as a structure on which the one or more seats 152/154 move. For example, the seat interface 156 can include one or more motors that can be used to move the one or more seats 152/154 to various locations within the vehicle cabin 150. Further, the seat interface 156 can include one or more structures on which the one or more seats move including one or more tracks, one or more rails, and/or one or more magnetic regions that attract one or more ferromagnetic portions of the one or more seats. For example, each of the one or more seats 152/154 can include one or more wheels that can move along one or more tracks of the seat interface 156. Furthermore, the seat interface 156 can receive one or more signals (e.g., one or more control signals) from the vehicle computing system 112. The one or more signals received from the vehicle computing system 112 can be used to perform the one or more operations of the seat interface 156 including moving the one or more seats 152/154 along the seat interface 156 and/or determining the state of each of the one or more seats 152/154.

In some embodiments, the vehicle computing system 112 can perform one or more operations including determining one or more locations of the one or more seats 152/154 with respect to the seat interface 156 based at least in part on the occupancy data including a layout of the one or more seats 152/154 in the vehicle 108.

In some embodiments, the vehicle computing system 112 can perform one or more operations including grouping at least one seat of the one or more seats 152/154 of the vehicle 108 to at least one other seat of the one or more seats 152/154 based at least in part on the configuration.

In some embodiments, the vehicle computing system 112 can perform one or more operations including grouping the one or more seats 152/154 of the vehicle 108 that will not be occupied based at least in part on the configuration.

In some embodiments, the vehicle computing system 112 can perform one or more operations including generating, based at least in part on the configuration, one or more seating indications associated with a seating status of each of the one or more seats 152/154 of the vehicle 108.

In some embodiments, the vehicle computing system 112 can perform one or more operations including determining one or more locations of the one or more seats 152/154 in the vehicle 108 based at least in part on the order in which the one or more passengers or cargo will enter or exit the vehicle 108.

In some embodiments, the vehicle computing system 112 can perform one or more operations including determining that the one or more passengers or cargo that will exit the vehicle 108 earlier are assigned to the one or more seats 152/154 in greater proximity to the one or more entrances 158 than the one or more passengers or cargo that will exit the vehicle 108 later.

In some embodiments, the vehicle computing system 112 can perform one or more operations including adjusting a location, an orientation, and/or a seating position of at least one seat of the one or more seats 152/154. The seating position can include a height of the at least one seat with respect to the vehicle 108, an angle of a seat back portion of the at least one seat, a height of an armrest portion of the at least one seat, or a height of a headrest portion of the at least one seat.

In some embodiments, the vehicle computing system 112 can perform one or more operations including determining, based at least in part on the occupancy data, one or more portions of the one or more seats 152/154 that will be visible to one or more passengers of the vehicle 108. The occupancy data can include a seating assignment for the one or more passengers. Further, the vehicle computing system 112 can perform one or more operations including determining that only the one or more passenger facing portions of each of the one or more seats 152/154 will be visible to the one or more passengers of the vehicle 108.

Figure 2:
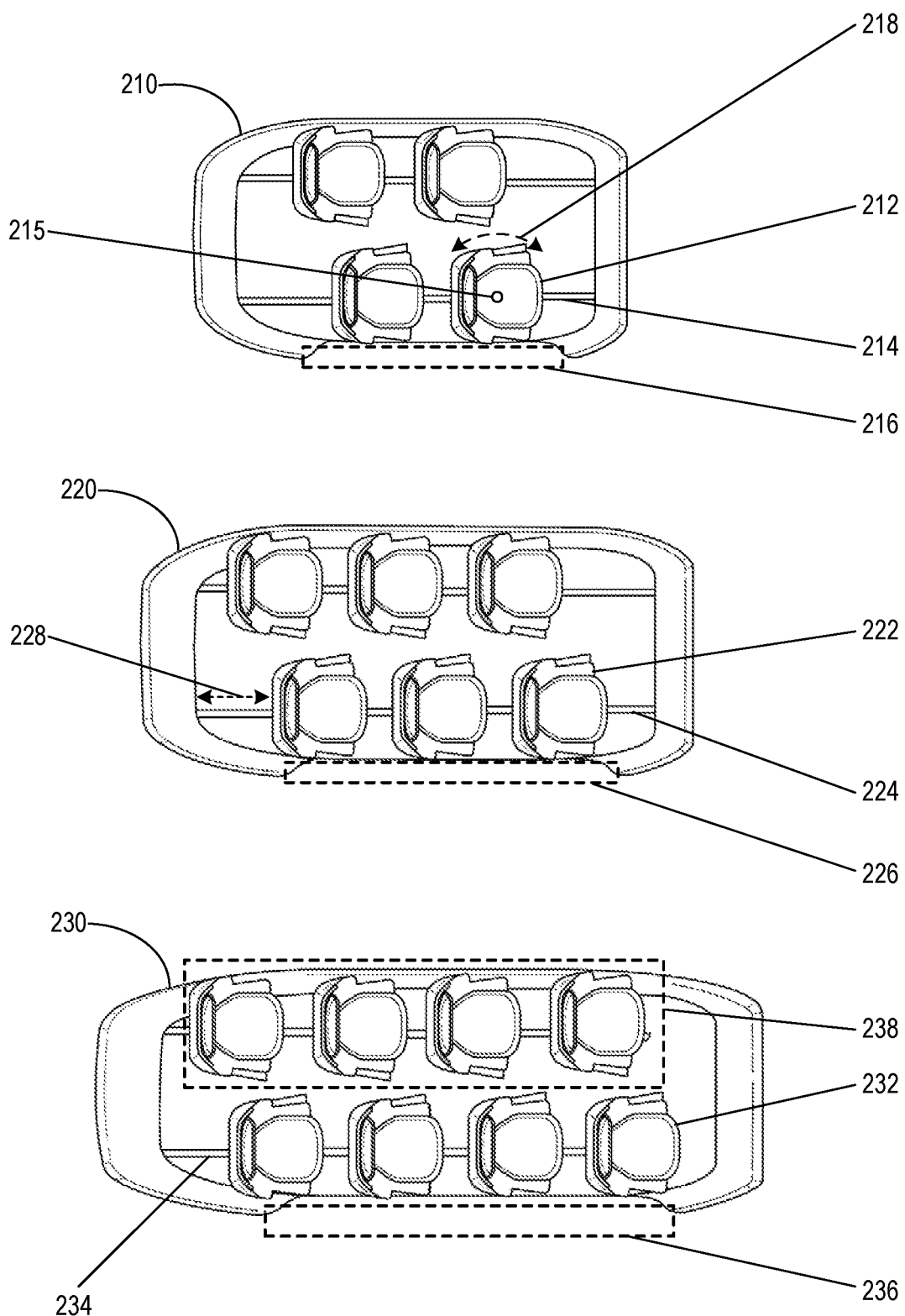
FIG. 2 depicts an example of vehicle seat configurations according to example embodiments of the present disclosure.

FIG. 2 depicts an example of vehicle seat configurations according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, depicted in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As illustrated, FIG. 2 shows a vehicle cabin 210, a seat 212, a seat interface 214, a central axis 215, an entrance 216, directions 218, a vehicle cabin 220, a seat 222, a seat interface 224, an entrance 226, a vehicle cabin 230, a seat 232, a seat interface 234, and an entrance 236.

The vehicle cabin 210, the vehicle cabin 220, and/or the vehicle cabin 230 can include one or more features of the vehicle cabin 150 that is depicted in FIG. 1. The seat 212/222/232 can include one or more features of the seats 152/154 that are depicted in FIG. 1. Further, the seat interface 214/224/234 can include one or more features of the seat interface 156 that is depicted in FIG. 1.

In this example, the vehicle cabin 210 is the interior portion of a vehicle (e.g., the vehicle 108) and is configured to include four seats. The four seats in the vehicle cabin 210 can include the seat 212 which is a seat that can rotate along a central axis 215 of the seat 212 in the directions indicated by the arrows illustrated on the rotational directions 218. Rotating the seat 212 can allow the seat to assume different positions that can, for example facilitate a passenger exiting the vehicle cabin 210 through the entrance 216 (e.g., an entrance including a door and/or window through which one or more passengers and/or articles of cargo can pass). Further, rotating the seat 212 can allow a passenger of the seat 212 to face in various directions including in the direction of other seats and fellow passengers inside the vehicle cabin 210. Further, the seat 212 can move along the seat interface 214 to which the seat 212 is attached. For example, the seat 212 can include one or more wheels that can facilitate movement (e.g., movement using manual power and/or motors of the seat 212 and/or seat interface 214) along one or more rails of the seat interface 214. Furthermore, in some embodiments, the seat 212 can be also detached from and reattached to the seat interface 214. In this way, the cabin 210 can include various seats that can be configured to improve access and flexibility of use with respect to the vehicle cabin 210.

The vehicle cabin 220 is the interior portion of a vehicle (e.g., the vehicle 108) and is configured to include six seats. The six seats in the vehicle cabin 220 can include the seat 222 which is a seat that can accommodate a variety of passengers and/or cargo and which can be configured (e.g., reclined, swiveled raised, lowered, and/or tilted) to assume different positions. Further, the entrance 226 can be used for one or more objects (e.g., passengers and/or cargo) to gain access to the interior of the vehicle cabin 220. Further, the seat 222 can move along the seat interface 224 to which the seat 222 is attached. For example, the seat 222 can include one or more ferromagnetic regions that can magnetically attach to one or more magnetic tracks of the seat interface 224. Further, the seat 222 can move along the seat interface 224 in the directions indicated by the directions 228. Furthermore, in some embodiments, the seat 222 can be also detached from and reattached to the seat interface 224 (e.g., magnetically attached and reattached). As such, the cabin 220 can be configured in different ways with different numbers of seats and/or different types of seats.

The vehicle cabin 230 is the interior portion of a vehicle (e.g., the vehicle 108) and is configured to include eight seats. The eight seats in the vehicle cabin 230 can include the seat 232 which is a seat that can be folded and/or collapsed to allow for a greater amount of usable space within the vehicle cabin 230. For example, the seat 232 can be folded and grouped (e.g., fitted together with other seats) with other seats of the vehicle cabin 230 to allow passengers seated in the region 238 (an inner row of the vehicle cabin 230) to exit the vehicle cabin 230 through the entrance 236. Further, the seat 232 can move along the seat interface 234 to which the seat 232 is attached. For example, the seat 232 can include one or more wheels that can facilitate movement along one or more rails of the seat interface 234. Furthermore, in some embodiments, the seat 232 can be also detached from and reattached to the seat interface 234. Accordingly, the cabin 230 can be configured in different ways that improve accessibility to and from various seating locations.

In some embodiments, a system including any of the vehicle cabin 210, the vehicle cabin 220, and/or the vehicle cabin 230 can perform one or more operations including receiving occupancy data including information associated with occupancy of a vehicle (e.g., the vehicle 108) that includes one or more seats (e.g., the seat 212); determining one or more states of the vehicle in which the one or more states of the vehicle can include a disposition of any object (e.g., a passenger and/or article of cargo) within the vehicle; determining a configuration of the one or more seats (e.g., an upright position or a downward position) based at least in part on the occupancy data and the one or more states of the vehicle, in which the configuration can include a disposition of the one or more seats inside the vehicle; and/or adjusting at least one seat of the one or more seats based at least in part on the configuration.

Figure 3:
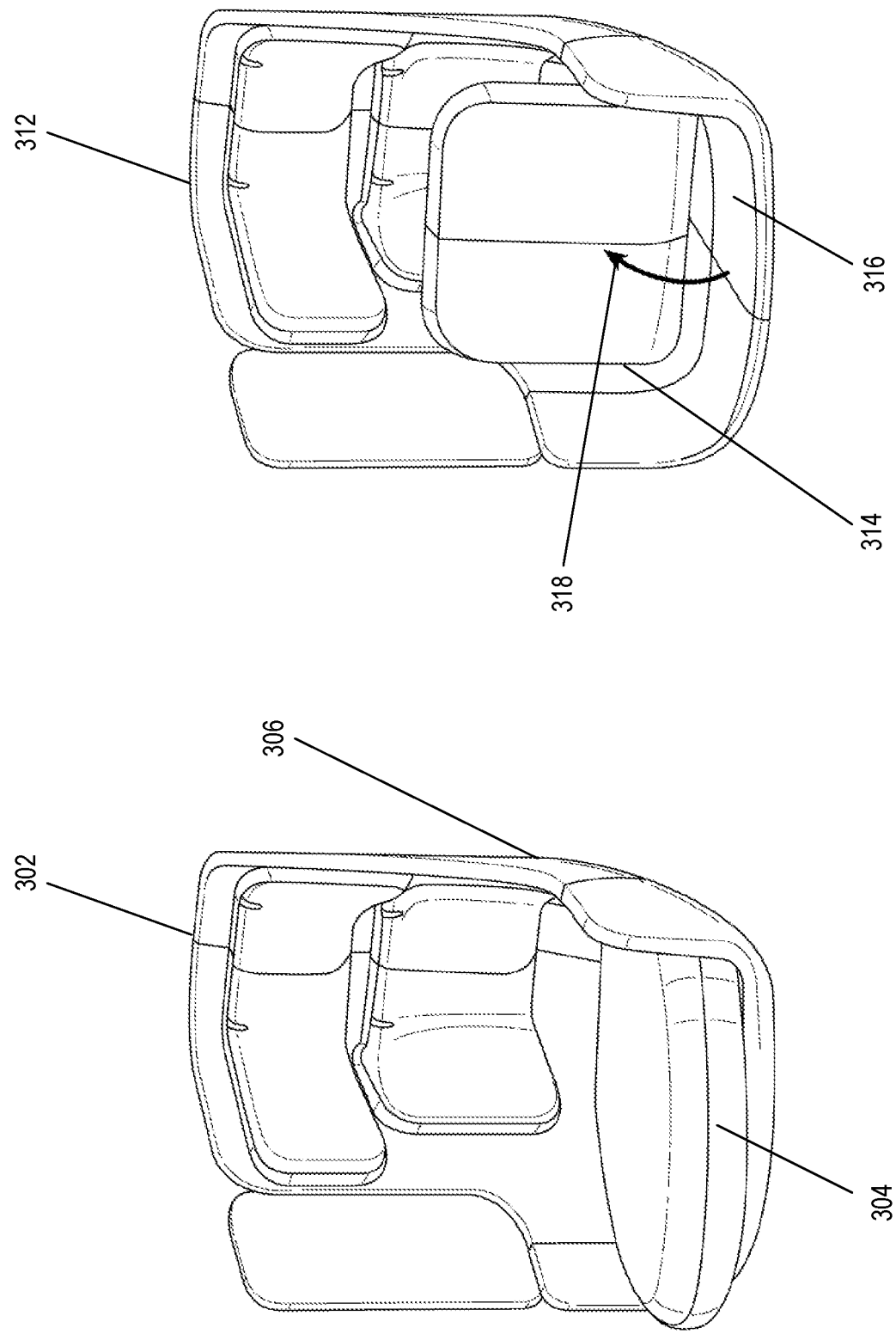
FIG. 3 depicts an example of configuring vehicle seats according to example embodiments of the present disclosure.

FIG. 3 depicts an example of configuring vehicle seats according to example embodiments of the present disclosure. One or more operations and/or functions or operations in FIG. 3 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows a seat 302, a seat bottom portion 304, a seat back portion 306, a seat 312, a seat bottom portion 314, a lower seat region 316, and a path 318.

The seat 302 and/or the seat 312 can include one more features of the one or more seats 152/154 that are depicted in FIG. 1. In this example, the seat bottom portion 304 of the seat 302 is in a downward facing position in which the seat bottom portion 304 can accommodate a passenger or an article of cargo. The seat bottom portion 314 of the seat 312 is in an upright position after having been folded along the path 318 from the lower seat region 316. The seat 302 and/or the seat 312 can include one or more devices and/or components that can be used to allow the seat bottom portion 314 to be moved, positioned, and/or folded. For example, the seat 302 and/or the seat 312 can include one or more joints and/or hinges that can be used to respectively move the seat bottom portion 304 and/or the seat bottom portion 314 into various downward facing and/or upright positions. Furthermore, various positions of the seat 302 and/or the seat 312 can be controlled via one or more motors of the seat 302 and/or the seat 312 that can be associated with a seat interface (e.g., the seat interface 156 that is depicted in FIG. 1) and/or a computing system (e.g., the vehicle computing system 112 that is depicted in FIG. 1).

When, the seat bottom portion 314 of the seat 312 is in the upright position, another seat including the seat 302 can be grouped together (e.g., fitted together or brought together) with the seat 312. For example, the seat back portion 306 of the seat 302 can nestle or nest into the lower seat region 316 and against the seat bottom portion 314. In this way, the seat 302 and the seat 312 can be grouped in a way that occupies a smaller footprint than when the seat bottom portion 314 is in the lowered position.

In some embodiments, a system including any of the seat 302 and/or the seat 312 can perform one or more operations including receiving occupancy data including information associated with occupancy of a vehicle (e.g., the vehicle 108) that includes one or more seats (e.g., the seat 302 and/or the seat 312); determining one or more states of the vehicle in which the one or more states of the vehicle can include a disposition of any object (e.g., a passenger and/or article of cargo) within the vehicle; determining a configuration of the one or more seats (e.g., an upright position or a downward position) based at least in part on the occupancy data and the one or more states of the vehicle, in which the configuration can include a disposition of the one or more seats inside the vehicle; and/or adjusting at least one seat of the one or more seats based at least in part on the configuration.

Figure 4:
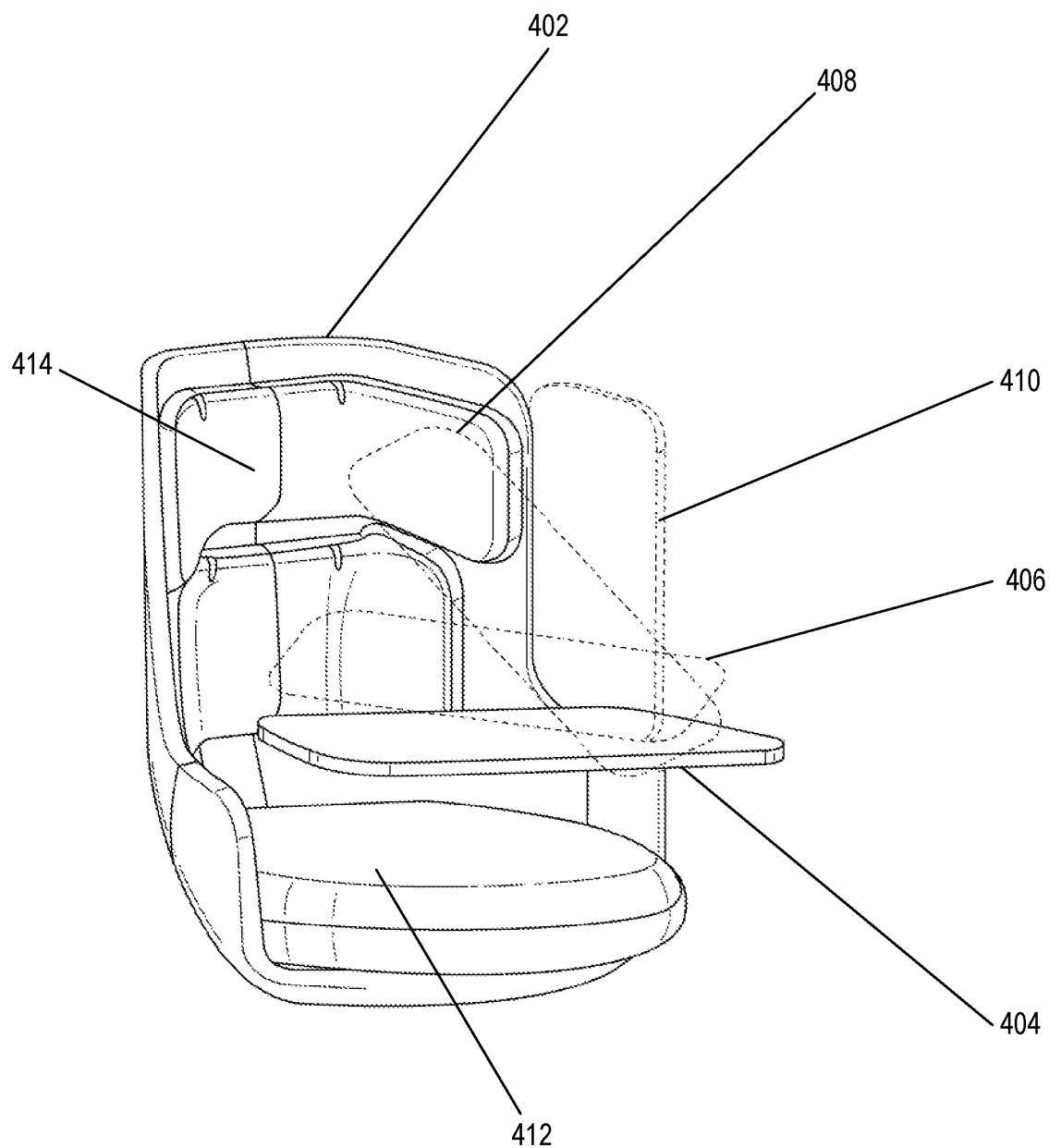
FIG. 4 depicts an example of configuring a vehicle seat according to example embodiments of the present disclosure.

FIG. 4 depicts an example of configuring a vehicle seat according to example embodiments of the present disclosure. One or more operations and/or functions or operations in FIG. 4 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 4 can include one or more features of one or more devices and/or systems including, for example, the operations computing system 104, the vehicle 108, or the vehicle computing system 112, which are depicted in FIG. 1.

As illustrated, FIG. 4 shows a seat 402, a seat panel 404, an intermediate position 406, an intermediate position 408, an upright position 410, an occupancy area 412, and a seat back portion 414.

Figure 8:
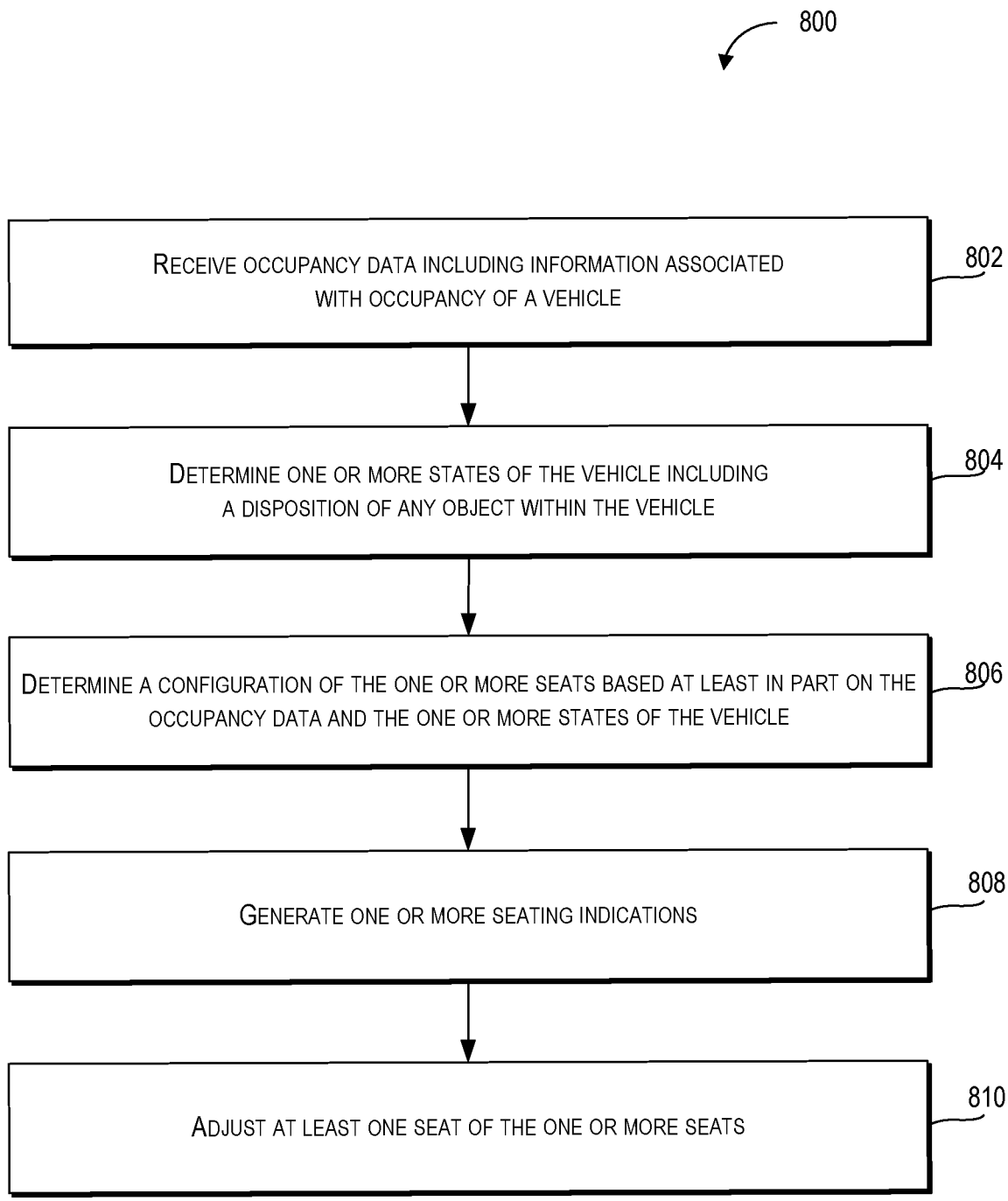
FIG. 8 depicts a flow diagram of an example method of configuring vehicle seats according to example embodiments of the present disclosure.

The seat 402 can include one more features of the one or more seats 152/154 that are depicted in FIG. 1. In this example, the seat panel 404 (e.g., a seat barrier as described in the method 800 that is depicted in FIG. 8) is in a downward facing position (e.g., facing the floor of a vehicle cabin in which the seat panel 404 is located). In the downward facing position, the seat panel 404 can, for example, be used as a table (e.g., a table for an occupant of the seat 402 to write on or on which to place articles of cargo).

Furthermore, the seat 402 can include one or more devices (e.g., one or more motors) and/or components that can be used to allow the seat panel 404 to be moved, positioned, collapsed, and/or folded. The seat 402 can include one or more joints and/or hinges that can be used to move the seat panel 404 into various downward facing, intermediate, and/or upright positions. For example, the seat panel 404 can be moved from the downward facing position in which the seat panel 404 is illustrated to the upright position 410 with the intermediate position 406 and the intermediate position 408 showing other positions to which the seat panel 404 can be positioned. Further, various positions of the seat 402 can be controlled via one or more motors of the seat 402 that can be associated with a seat interface (e.g., the seat interface 156 that is depicted in FIG. 1) and/or a computing system (e.g., the vehicle computing system 112 that is depicted in FIG. 1).

When, the seat panel 404 is in the upright position 410, the seat panel 404 can be used as a barrier against intrusion (e.g., physical intrusion and/or sound) from adjacent areas, including areas occupied by other seats. For example, in the upright position 410, the seat panel 404 can be used to reduce access to the seat 402 (including the occupancy area 412) from other passengers and/or cargo.

Furthermore, positioning the seat panel 404 in the upright position 410 allows the seat 402 to be grouped together (e.g., fitted together or brought together) with other seats. For example, another seat can nestle or nest into the occupancy area 412 and against the seat back portion 414. In this way, the seat 402 can be grouped with other seats in a way that occupies a smaller footprint than when the seat panel 404 is in the downward facing position.

In some embodiments, a system including any of the seat 402 can perform one or more operations including receiving occupancy data including information associated with occupancy of a vehicle (e.g., the vehicle 108) that includes one or more seats (e.g., the seat 402); determining one or more states of the vehicle in which the one or more states of the vehicle can include a disposition of any object (e.g., a passenger and/or article of cargo) within the vehicle; determining a configuration of the one or more seats (e.g., an upright position or a downward position) based at least in part on the occupancy data and the one or more states of the vehicle, in which the configuration can include a disposition of the one or more seats inside the vehicle; and/or adjusting at least one seat of the one or more seats based at least in part on the configuration.

Figure 5:
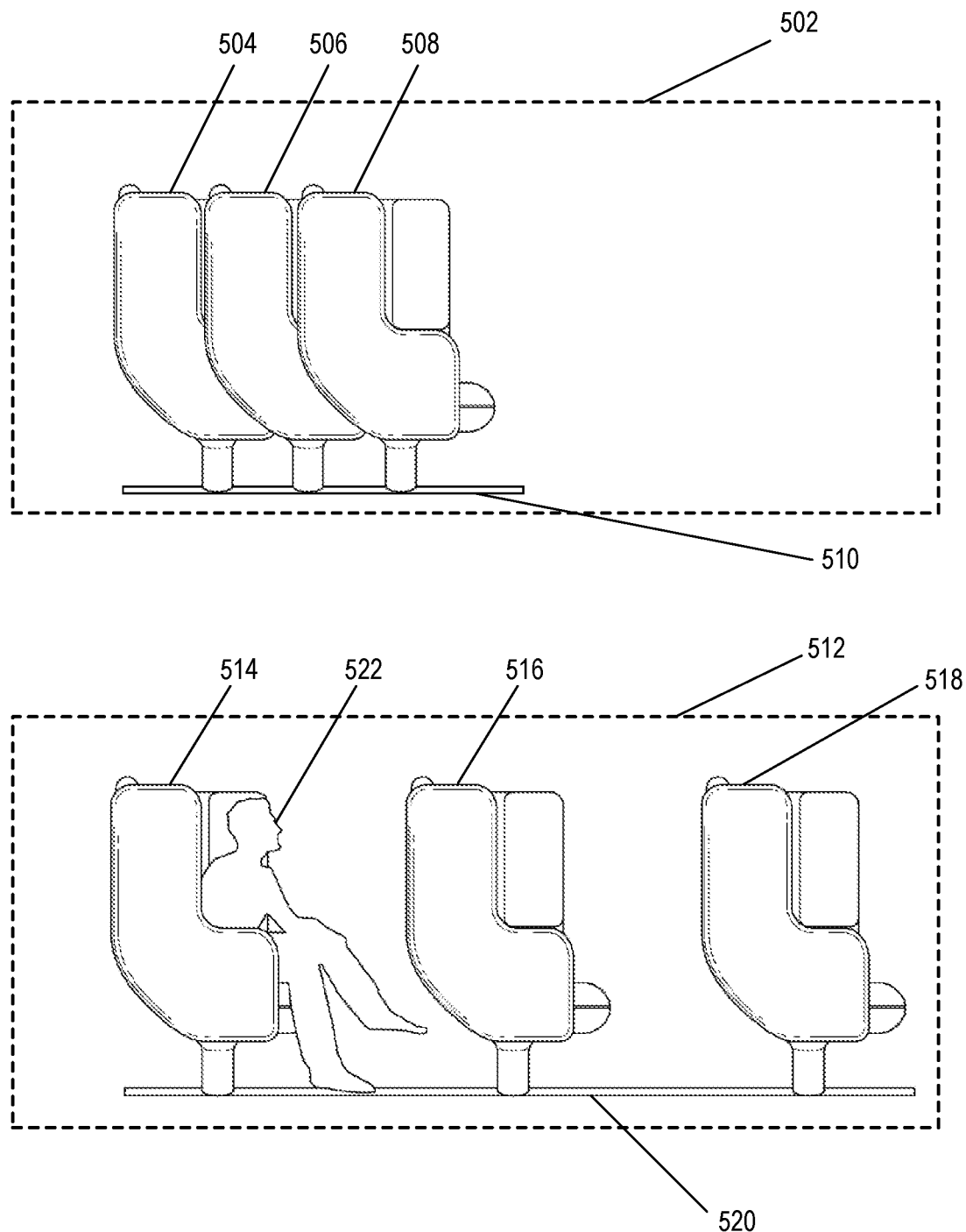
FIG. 5 depicts an example of configuring vehicle seats according to example embodiments of the present disclosure.

FIG. 5 depicts an example of configuring vehicle seats according to example embodiments of the present disclosure. One or more operations and/or functions in FIG. 5 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 5 can include one or more features of one or more devices and/or systems including, for example, the operations computing system 104, the vehicle 108, or the vehicle computing system 112, which are depicted in FIG. 1.

As illustrated, FIG. 5 shows a configuration 502, a seat 504, a seat 506, a seat 508, a seat interface 510, a configuration 512, a seat 514, a seat 516, a seat 518, a seat interface 520, and passenger 522. The seats 504/506/508 and/or the seats 514/516/518 can include one more features of the one or more seats 152/154 that are depicted in FIG. 1. Further, the seat interface 510 and/or the seat interface 520 can include one or more features of the seat interface 156 that is depicted in FIG. 1.

In this example, in the configuration 502, the seat 504, the seat 506, and the seat 506 are grouped together (e.g., the seat 508 is nestled in the seat 506 which is nestled in the seat 504). In some embodiments, the seats 504/506/508 can be configured with one or more wheels that allow the seats 504/506/508 to be grouped by moving along the seat interface 510 to which the seats 504/506/508 are connected.

In the configuration 512, the seat 514, the seat 516, and the seat 516 are configured to allow for a passenger to sit in, and access, any of the seats 514/516/518. For example, the passenger 522 can sit in the seat 514 which is far enough from the seat 516 that the passenger 522 has ample room to sit comfortably. In some embodiments, the seats 504/506/508 can be configured with one or more sliding components that allow the seats 514/516/518 to be configured to seat passengers by moving along the seat interface 520 to which the seats 514/516/518 are connected.

In some embodiments, a system including any of the seats 504/506/508 in the configuration 502 and/or the seats 514/516/518 in the configuration 512 can perform one or more operations including receiving occupancy data including information associated with occupancy of a vehicle (e.g., the vehicle 108) that includes one or more seats (e.g., the seat 514); determining one or more states of the vehicle in which the one or more states of the vehicle can include a disposition of any object (e.g., a passenger and/or article of cargo) within the vehicle; determining a configuration (e.g., the configuration 512) of the one or more seats (e.g., arranging the seats 514/516/518 to accommodate the passenger 522 in the seat 514) based at least in part on the occupancy data and the one or more states of the vehicle, in which the configuration can include a disposition of the one or more seats inside the vehicle; and/or adjusting at least one seat of the one or more seats based at least in part on the configuration.

Figure 6:
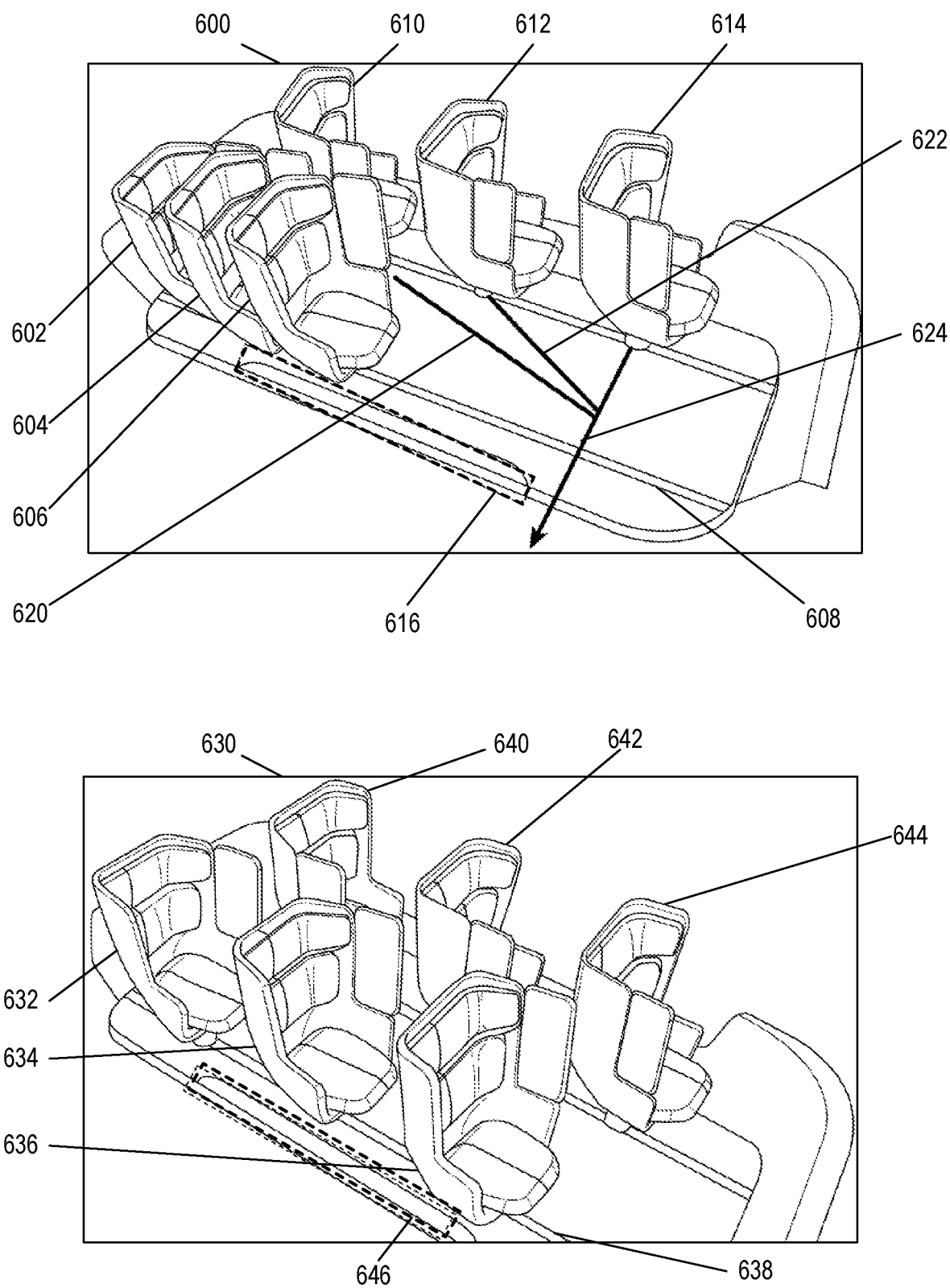
FIG. 6 depicts an example of configuring vehicle seats according to example embodiments of the present disclosure.

FIG. 6 depicts an example of configuring vehicle seats according to example embodiments of the present disclosure. One or more operations and/or functions or operations in FIG. 6 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 6 can include one or more features of one or more devices and/or systems including, for example, the operations computing system 104, the vehicle 108, or the vehicle computing system 112, which are depicted in FIG. 1.

As illustrated, FIG. 6 shows a vehicle configuration system 600 including a seat 602, a seat 604, a seat 606, a seat 610, a seat 612, a seat 614, an entrance 616, a path 620, a path 622, and a path 624. Further, FIG. 6 shows a vehicle configuration system 630 including a seat 632, a seat 634, a seat 636, a seat 640, a seat 642, a seat 644, and an entrance 646. The vehicle configuration system 600 and/or the vehicle configuration system 630 can include one more features of the vehicle 108 that is depicted in FIG. 1.

In this example, in the vehicle configuration system 600, the seats 602, the seat 604, and the seat 606 are grouped together (e.g., the seat 606 is nestled in the seat 604 which is nestled in the seat 602). In some embodiments, the seats 602/604/606 can be configured with one or more wheels that allow the seats 602/604/606 to be grouped by moving along the seat interface 608 to which the seats 602/604/606 are connected. Furthermore, when the seats 602/604/606 are grouped, the location of the seats 602/604/606 can facilitates access to and from the seats 610/612/614. For example, a passenger and/or an article of cargo can move between the entrance 616 and the seat 610 via the path 620; a passenger and/or an article of cargo can move between the entrance 616 and the seat 612 via the path 622; and a passenger and/or an article of cargo can move between the entrance 616 and the seat 614 via the path 624.

In the vehicle configuration system 630, any of the seats 632/634/636 can move along the seat interface 638. For example, the seats 632/634/636 can be grouped together. As shown, the seats 632/634/636 are not grouped, which can allow passengers to have enough space to be seated in the seats 632/634/636. Further, as configured, the seats 632/634/636 can impede movement between the entrance 726 and the seats 640/642/644.

In some embodiments, any of the vehicle configuration system 600 and/or the vehicle configuration system 630 can perform one or more operations including receiving occupancy data including information associated with occupancy of a vehicle (e.g., the vehicle 108) that includes one or more seats (e.g., the seat 602); determining one or more states of the vehicle in which the one or more states of the vehicle can include a disposition of any object (e.g., a passenger and/or article of cargo) within the vehicle; determining a configuration of the one or more seats (e.g., an upright position or a downward position) based at least in part on the occupancy data and the one or more states of the vehicle, in which the configuration can include a disposition of the one or more seats inside the vehicle; and/or adjusting at least one seat of the one or more seats based at least in part on the configuration.

Figure 7:
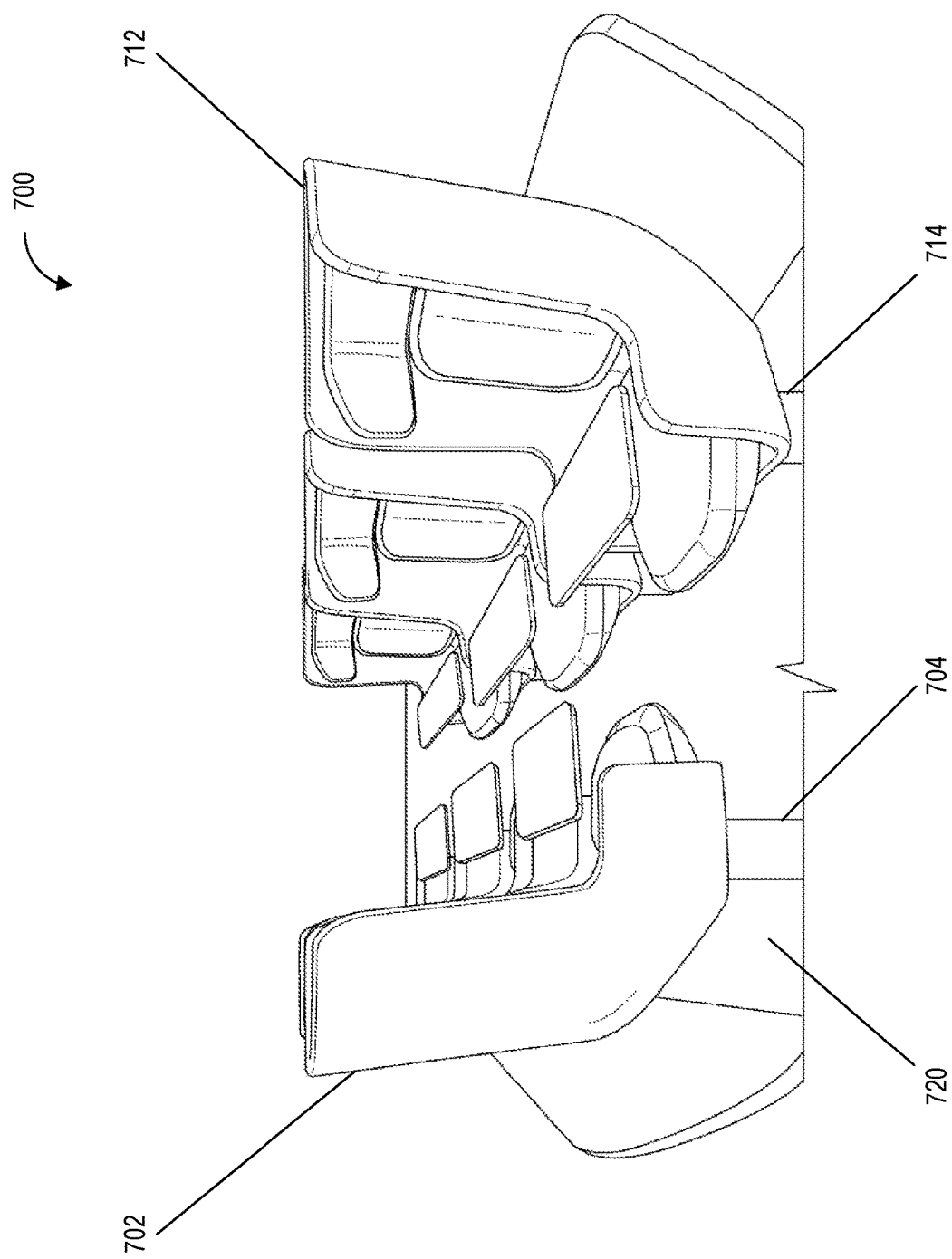
FIG. 7 depicts an example of a vehicle configuration system according to example embodiments of the present disclosure.

FIG. 7 depicts an example of a vehicle configuration system according to example embodiments of the present disclosure. One or more operations and/or functions or operations in FIG. 7 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 7 can include one or more features of one or more devices and/or systems including, for example, the operations computing system 104, the vehicle 108, or the vehicle computing system 112, which are depicted in FIG. 1.

As illustrated, FIG. 7 shows a vehicle configuration system 700 including a seat 702, a seat connector 704, a seat 712, a seat connector 714, and a seat interface 720. The vehicle configuration system 700 can include one more features of the vehicle 108 that is depicted in FIG. 1.

In this example, the seat 702 includes a seat connector 704 by which the seat 702 is connected (e.g., magnetically connected) to the seat interface 720 which is beneath the seat 702. The seat connector 704 allows the seat 702 to rotate, including rotating so that the seat 702 is facing the seat 712 that is opposite the seat 702. Further, the seat 712 includes a seat connector 714 by which the seat 712 is connected (e.g., connected to a groove in the seat interface 720) to the seat interface 720 which is beneath the seat 712. The seat connector 714 allows the seat 712 to rotate, including rotating so that the seat 712 is facing the seat 702 that is opposite the seat 712. In this way, the vehicle configuration system 700 can allow for various seat arrangements that are more flexible and apropos of the layout for a desired functionality which can include a conference style layout in which seats face one another or a seating arrangement in which seats face in the same direction.

In some embodiments, the vehicle configuration system 700 can perform one or more operations including receiving occupancy data including information associated with occupancy of a vehicle (e.g., the vehicle 108) that includes one or more seats (e.g., the seat 702); determining one or more states of the vehicle in which the one or more states of the vehicle can include a disposition of any object (e.g., a passenger and/or article of cargo) within the vehicle; determining a configuration of the one or more seats (e.g., an upright position or a downward position) based at least in part on the occupancy data and the one or more states of the vehicle, in which the configuration can include a disposition of the one or more seats inside the vehicle; and/or adjusting at least one seat of the one or more seats based at least in part on the configuration.

FIG. 8 depicts a flow diagram of an example method of configuring vehicle seats according to example embodiments of the present disclosure. One or more portions of a method 800 can be implemented by one or more devices (e.g., one or more computing devices) or systems including, for example, the operations computing system 104, the vehicle 108, or the vehicle computing system 112, which are shown in FIG. 1. Moreover, one or more portions of the method 800 can be implemented as an algorithm on the hardware components of the devices described herein (e.g., as in FIG. 1) to, for example, generate control signals to perform operations including adjusting seats associated with a vehicle. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include receiving occupancy data including information associated with occupancy of a vehicle that can include one or more seats. For example, the vehicle computing system 112 can, via a wireless and/or wired connection, receive occupancy data from one or more remote computing devices (e.g., laptop computing devices, smartphones, and/or server computing devices associated with assigning passengers and/or cargo to the vehicle 108). By way of further example, the vehicle computing system 112 can include an input device (e.g., a touchscreen display panel) that can receive user input with respect to various seat configurations. A user can then generate a vehicle seat configuration by providing one or more inputs to the input device. The user input can then be used to generate occupancy data that will be sent to a portion of the vehicle computing system 112 that will generate a configuration based at least in part on the occupancy data.

In some embodiments, the occupancy data can be associated with information including a number of passengers that will occupy the one or more seats, and/or an amount of cargo that will occupy the vehicle. For example, the occupancy data can indicate that two passengers and four articles of cargo (e.g., four irregularly shaped bags with a length of half a meter, a height of a tenth of a meter, a depth of a tenth of a meter, and with a mass of ten kilograms each) will be entering the vehicle 108 and occupying the one or more seats including the one or more seats 152/154. Furthermore, the occupancy data can include one or more personal preferences of passengers including entertainment preferences (e.g., a passenger can be seated behind a seat with an entertainment system on the back of the seat).

In some embodiments, the occupancy data can include a seating assignment for one or more passengers currently occupying a vehicle. Further, the seating assignment of the occupancy data can indicate the one or more seats to which each of one or more passengers entering a vehicle are assigned to be seated. For example, the vehicle computing system 112 can receive occupancy data include a list of the one or more seats 152/154 each of which is associated with the name or other identifier for a passenger that is about to enter the vehicle 108.

In some embodiments, the occupancy data can include information associated with one or more seat configurations of the seat associated with a passenger. Further, the one or more seat configurations can include a seat height, a seat headrest height, a seat armrest height, a seat back angle, and/or an accessibility status (e.g., an accessibility status indicating the suitability of a seat for use by an individual with a physical impairment or needing assistance in entering and/or exiting the vehicle). For example, the occupancy data can indicate that a passenger will require a seat that includes hand grips that facilitate getting into and out of the seat.

In some embodiments, the occupancy data can include a number of the one or more seats that will be occupied (e.g., a number of the one or more seats that will be occupied by passengers and/or cargo). For example, the occupancy data can include a number of the one or more seats including the one or more seats 152/154 that will be occupied and/or a complementary value indicating the number of the one or more seats that will be available for use (e.g., available for passengers and/or articles of cargo).

In some embodiments, the vehicle can include a seat interface to which the one or more seats are connected. Further, the seat interface can be configured to enable movement of the one or more seats to one or more different locations in the vehicle. Further, the seat interface can include one or more tracks, one or more rails, and/or one or more magnetic regions that attract one or more ferromagnetic portions of the one or more seats. For example, the one or more seats 152/154 can move along one or more tracks of the seat interface 156, allowing the one or more seats to be located at different portions of the vehicle's interior. Further, the one or more seats can be moved to the various parts of the vehicle including the front of the vehicle, the back of the vehicle, the middle portion of the vehicle, and/or different rows of the vehicle.

Furthermore, each of the one or more seats can be attachable to the seat interface and/or detachable from the seat interface. For example, each of the one or more seats including the one or more seats 152/154 can be attached and/or detached to the vehicle 108 (e.g., the vehicle cabin 150 of the vehicle which can include the seat interface 156) using one or more locking devices and/or joining devices including one or more clasps, one or more latches, one or more grooves (e.g., grooves in the floor or walls of the vehicle cabin 150 that can hold protrusions from the one or more seats 152/154), and/or one or more indentations (e.g., indentations in the floor or walls of the vehicle cabin 150 that can securely contain protrusions from the one or more seats 152/154).

In some embodiments, at least one of the one or more seats can be configured to be grouped with at least one other seat of the one or more seats. Grouping can include nesting, nestling, stacking, and/or fitting together the at least one seat to at least one other seat of the one or more seats. Each of the one or more seats can be shaped to fit together with the other seats. Further, the one or more seats can be shaped so that when seats are grouped together most of the back portion of a seat will be in contact with the front portion of the seat to which it is grouped. Furthermore, the one or more seats can be configured so that a portion of a seat can slide onto the top portion of another seat when the seats are brought together. For example, the bottom portions of the one or more seats 152 (e.g., the part of the seat a passenger sits on) can lift upwards and onto the top of the bottom portions of the one or more seats 154, thereby nestling one seat into another seat.

In some embodiments, the vehicle can include at least one entrance into the vehicle. For example, the one or more entrances 158 can include an opening, one or more doors, one or more windows, and/or one or more cargo areas (e.g., a trunk) that allow access into and from the cabin 150 of the vehicle 108. Further, the at least one entrance into the vehicle can be configured to open, close, lock, and/or unlock.

In some embodiments, each of the one or more seats can include one or more portions that fold, collapse, retract, and/or extend. For example, a lower seating portion of the one or more seats 152/154 can be folded downwards, which can allow for more compact grouping of the one or more seats that creates more horizontal space inside the vehicle. By way of further example, a portion of the one or more seats 152/154 can be retracted into an armrest of the seat to facilitate grouping of the one or more seats 152/154.

In some embodiments, the one or more seats can include one or more barriers that can be configured to reduce access to the at least one seat. For example, a seat can include a barrier (e.g., a barrier including one or more features of the seat panel 404 that is depicted in FIG. 4) that retracts upwards from both the left and right armrests of a seat of the one or more seats 152/154 to the ceiling of the vehicle cabin 150, thereby reducing access to the seat from other seats to the left and right of the seat. By way of further example, the one or more barriers can include one or more fabric barriers (e.g., any combination of cotton, silk, or nylon barriers), one or more transparent barriers (e.g., any combination of clear glass and/or clear plastic barriers), soft barriers (e.g., barriers made from a cushioned material including soft leather and/or soft upholstery), and/or one or more hard barriers (e.g., barriers made from hard plastic, wood, and/or metal).

In some embodiments, the occupancy data can include a layout of the one or more seats in the vehicle. For example, the occupancy data can indicate a layout in which three seats of the one or more seats 152/154 on the left side of the vehicle 108 will be arranged facing three opposing seats on the other side of the of the vehicle 108.

In some embodiments, the occupancy data can include an order in which one or more passengers or cargo will enter or exit the vehicle. For example, the occupancy data can indicate that three passengers, Dominica, Elijah, and Francis will enter the vehicle 108 starting with Dominica and ending with Francis.

In some embodiments, each of the one or more seats can include one or more passenger facing portions and one or more non-passenger facing portions. The one or more passenger facing portions of the one or more seats can include the portions of each seat that a passenger can be seated on (e.g., the upholstered portions of the seat that the passenger will come into contact with), view (e.g., the portions of the seat are visible from the seating position of a passenger), and/or come into contact with (e.g., the rear seatback portion of a seat that includes storage bin). By way of example, the materials included in each of the one or more passenger facing portions can include leather (e.g., genuine leather and/or synthetic leather), smooth plastics, soft-touch plastics, and/or fabric (e.g., any combination of natural and/or synthetic fabrics including wool, cotton, nylon, silk, and/or polyester) portions of a seat that the passenger will sit on, view, and/or come into contact with. Further, the one or more passenger facing portions of the seat can be configured using various designs (e.g., patterns and/or pictures), textures, padded portions (e.g., cushioning to improve passenger comfort including cushioned seat backs, seat bottoms, and/or seat armrests), and/or colors that are more ergonomic and/or aesthetically pleasing.

Further, the one or more non-passenger facing portions can include the portions of the seat that a passenger will not be seated on (e.g., the underside portion of a seat) and/or come into contact with (e.g., the portions of a seat that passenger will not come into contact with in the regular course of using the seat). The one or more non-passenger facing portions of the seat can include any portions of a seat that include exposed screws, exposed nuts, exposed bolts, sharp edges, rough edges, coarse surfaces, lubricant, bare electronics, and/or wiring. Further, the one or more non-passenger facing portions of the seat can include surfaces (e.g., metal, plastic, glass, and/or wood) that are in an unfinished state (e.g., unpainted, unvarnished, and/or not sanded to a smooth finish).

In some embodiments, the occupancy data can include a seating assignment for the one or more passengers that can be used to determine the portions of the vehicle (e.g., the vehicle cabin 150) including the one or more portions of the one or more seats that will be visible to the one or more passengers. For example, the occupancy data can include each of the assigned seats that a passenger will sit in and an area including the one or more portions of the vehicle cabin 150 that are visible from each of the assigned seats.

At 804, the method 800 can include determining one or more states of the vehicle. The one or more states of the vehicle can include a disposition (e.g., a location, position, orientation, and/or way in which an object is arranged with respect to other objects or the vehicle) of any object within the vehicle. For example, the vehicle computing system 112 can receive one or more sensor outputs from one or more sensors 114 (e.g., one or more cameras, radar, sonar, and/or pressure sensors) of the vehicle 108 that can be used to detect one or more objects in the vehicle cabin 150 of the vehicle 108. The vehicle computing system 112 can use the one or more sensor outputs to determine the disposition of objects in the vehicle (e.g., the amount of passengers and/or cargo in the vehicle 108 and/or the location of the one or more seats 152/154 in the vehicle 108). By way of further example, the vehicle computing system 112 can determine the location and/or position of the one or more seats 152/154 based at least in part on one or more control signals and/or or data indicating the disposition of the one or more seats 152/154 (e.g., the vehicle computing system 112 can poll the one or more seats 152/154 and, in response, receive data indicating the seat disposition from each of the one or more seats 152/154).

At 806, the method 800 can include determining a configuration of the one or more seats based at least in part on the occupancy data and/or the one or more states of the vehicle. The configuration can include a disposition of the one or more seats inside the vehicle. Further, the configuration can include a location of each of the one or more seats with respect to the seat interface, the other seats of the one or more seats, or some point of reference within the vehicle. By way of example, the vehicle computing system 112 can determine a configuration indicating, with respect to the seat interface 156, each of the one or more seats 152/154 that are grouped, the location of each of the one or more seats 152/154 that are grouped, and/or the location of each of the one or more seats 152/154 that are not grouped. By way of further example, the configuration of the one or more seats 152/154 on the seat interface 156 that includes one or more tracks can include the position of each of the one or more seats 152/154 along each of the one or more tracks of the seat interface 156.

Furthermore, in some embodiments, the configuration of the one or more seats can include a location of each of the one or more seats in the vehicle, an orientation of each of the one or more seats with respect to the vehicle, and/or a seating position of each of the one or more seats. For example, the location of each of the one or more seats 152/154 can include a set of Cartesian coordinates with respect to the vehicle cabin 150 of the vehicle 108 and/or a row, column, and/or side of the vehicle cabin 150.

At 808, the method 800 can include generating, based at least in part on the configuration, one or more seating indications associated with a seating status of each of the one or more seats. Further, the one or more seating indications can include one or more visual indications, one or more audible indications, and/or one or more haptic indications. For example, the one or more seating indications can include various indications that can be used to indicate the state of a seat (e.g., available or unavailable), indicate a seat identifier (e.g., a seat code assigned to a particular passenger), and/or a message (e.g., "PLEASE SIT DOWN").

In some embodiments the one or more visual indications can be displayed on one or more areas of the one or more seats. Further, the one or more visual indications can include illumination of the one or more areas of the one or more seats, one or more textual messages displayed on the one or more areas of the one or more seats, and/or one or more colors displayed on the one or more areas of the one or more seats. For example, the one or more visual indications can include illuminating a red light (e.g., a red colored LED) on a display area of a seat of the one or more seats 152 to indicate that the seat is unavailable or illuminating a blue light (e.g., a blue colored LED) on a display area of the seat to indicate an article of cargo can be placed on the seat.

At 810, the method 800 can include adjusting at least one seat of the one or more seats based at least in part on the configuration. Adjusting the at least one seat of the one or more seats can include adjusting a location, an orientation, and/or a seating position of at least one seat of the one or more seats. For example, the vehicle computing system 112 can generate one or more control signals that can be used to activate one or more motors of the seat interface 156 and/or the one or more seats 152/154 that can move any of the one or more seats 152/154 to different locations in the vehicle 108 (e.g., grouping some of the one or more seats 152/154 and/or moving some of the one or more seats 152/154 to other portions of the vehicle cabin 150). Further, the one or more control signals generated by the vehicle computing system 112 can be used to adjust the position of each of the one or more seats 152/154 (e.g., rotating a seat).

By way of further example, the configuration (e.g., one or more control signals and/or data associated with the configuration) can be used to activate one or more motors that adjust the orientation of the at least one seat from a forward-facing position (e.g., a position facing the vehicle's forward direction of travel) to a side-facing position (e.g., a position that is perpendicular to the forward-facing position). Further, in a vehicle including a plurality of seats, the configuration (e.g., one or more control signals and/or data associated with the configuration) can be used to activate one or more motors that adjust a first set of the plurality of seats from the forward-facing position to a side-facing position and adjust a second set of the plurality of seats in a row parallel to the first set of the plurality of seats, to face the first set of the plurality of seats. In this way, the seats in the vehicle can be arranged so that passengers of the seat are facing one another, for example, as illustrated in the vehicle configuration system 700 that is depicted in FIG. 7.

In some embodiments, generating one or more control signals and/or data to control the one or more seats based at least in part on the configuration can be included in adjusting at least one seat of the one or more seats based at least in part on the configuration. For example, the vehicle computing system 112 can, based on the configuration, generate one or more control signals (e.g., electronic signals) and/or data associated with performance of one or more operations including controlling movement of the one or more seats and/or controlling movement of the seat interface. For example, the vehicle computing system 112 can generate one or more control signals and/or data that can be sent to the one or more seats 152/154 and/or the seat interface 156 to adjust the one or more seats 152/156 including changing the location, angle, height, and/or position of the one or more seats 152/154 in the vehicle cabin 150 of the vehicle 108.

Figure 9:
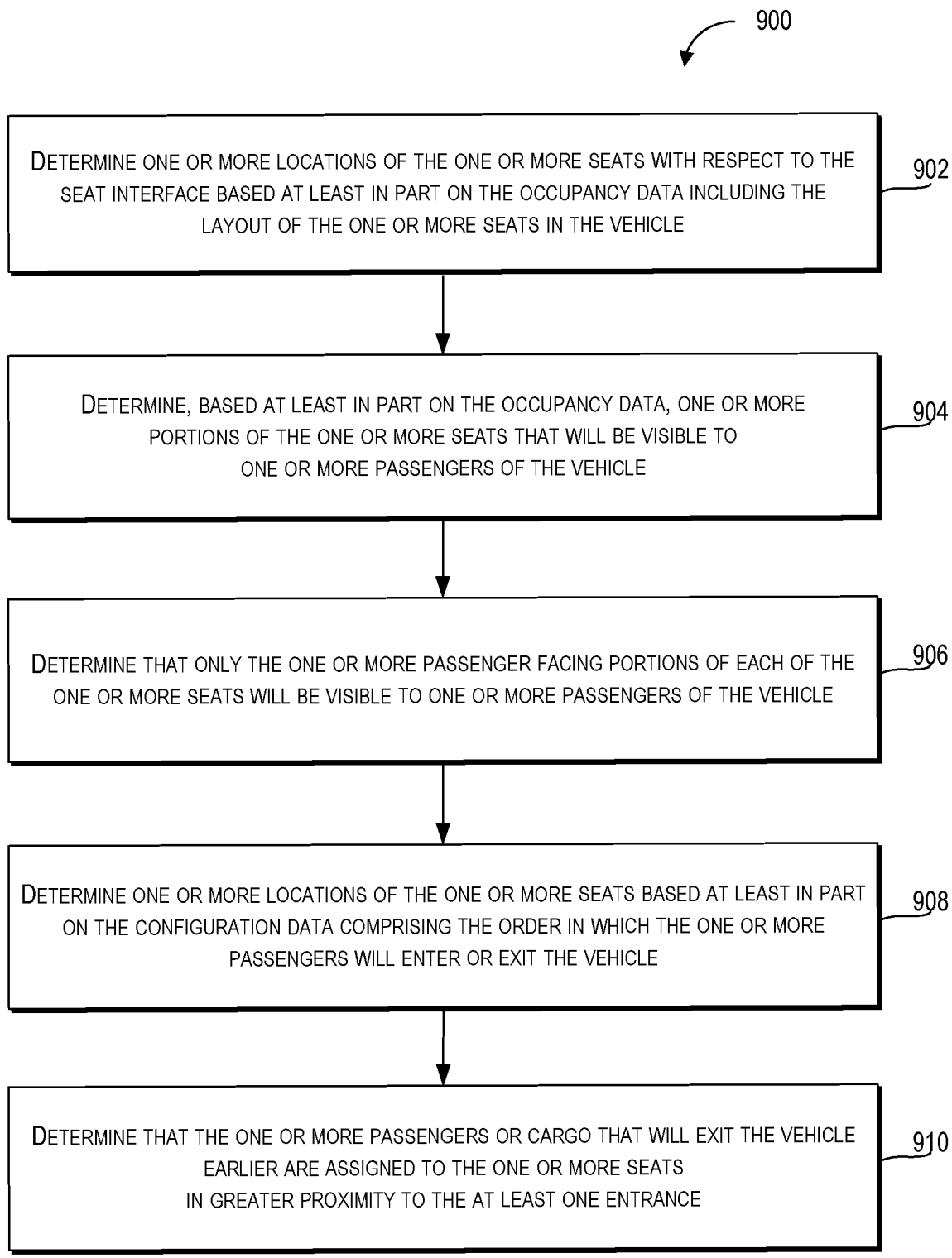
FIG. 9 depicts a flow diagram of an example method of configuring vehicle seats according to example embodiments of the present disclosure.

FIG. 9 depicts a flow diagram of an example method of configuring vehicle seats according to example embodiments of the present disclosure. One or more portions of a method 900 can be implemented by one or more devices (e.g., one or more computing devices) or systems including, for example, the operations computing system 104, the vehicle 108, or the vehicle computing system 112, which are shown in FIG. 1. Moreover, one or more portions of the method 900 can be implemented as an algorithm on the hardware components of the devices described herein (e.g., as in FIG. 1) to, for example, generate control signals to perform operations including adjusting seats associated with a vehicle. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In example embodiments, one or more portions of the method 900 can be performed as part of the method 800 that is depicted in FIG. 8. Further, one or more portions of the method 900 can be performed as part of determining a configuration of the one or more seats based at least in part on the occupancy data and the one or more states of the vehicle as described in 806 of the method 800 that is depicted in FIG. 8.

At 902, the method 900 can include determining one or more locations of the one or more seats with respect to the seat interface based at least in part on the occupancy data including the layout of the one or more seats in the vehicle. For example, the vehicle computing system 112 can determine that one or more motors of the one or more seats 152/154 and/or the seat interface 156 will be activated to position the one or more seats 152/154 in accordance with a layout in which all of the one or more seats 152/154 are facing the forward portion of the vehicle 108.

In some embodiments, determining one or more locations of the one or more seats with respect to the seat interface based at least in part on the occupancy data including the layout of the one or more seats in the vehicle can be performed as part of determining a configuration of the one or more seats based at least in part on the occupancy data and the one or more states of the vehicle as described in 806 of the method 800 that is depicted in FIG. 8.

At 904, the method 900 can include determining, based at least in part on the occupancy data, one or more portions of the one or more seats that will be visible to one or more passengers of the vehicle. For example, the vehicle computing system 112 can determine based at least in part on the seating assignment from the occupancy data, the one or more portions of the one or more seats that will be visible to the one or more passengers can include the seat assigned to a passenger, and/or the one or more portions of the one or more seats that are in front of or adjacent to the seat assigned to a passenger. By way of further example, the vehicle computing system 112 can determine based at least in part on the seating assignment from the occupancy data, the one or more portions of the one or more seats that will be visible to the one or more passengers can be based at least in part on a viewing angle from the seat to which one or more passengers are assigned (e.g., a vertical viewing angle, and/or a horizontal field of view)

In some embodiments, determining, based at least in part on the occupancy data, one or more portions of the one or more seats that will be visible to one or more passengers of the vehicle can be performed as part of determining a configuration of the one or more seats based at least in part on the occupancy data and the one or more states of the vehicle as described in 806 of the method 800 that is depicted in FIG. 8.

At 906, the method 900 can include determining that only the one or more passenger facing portions of each of the one or more seats will be visible (e.g., in front of a passenger or in a passenger's line of sight) to one or more passengers of the vehicle. By way of example, the one or more seats 152/154 of the vehicle 108 can include one or more seats with a bottom portion that, when folded upwards, exposes a non-passenger facing underside portion of the seat that includes unfinished surfaces with rough edges and exposed screws. Further, the occupancy data can include a number of passengers and/or the seating assignment for passengers that will enter the vehicle. The vehicle computing system 112 can then determine the one or more portions of the one or more seats that will be visible to one or more passengers of the vehicle based at least in part on the passengers seating assignments. The vehicle computing system 112 can determine that when the bottom portion of a seat that will not be occupied by a passenger is folded upwards (making the unfinished surfaces visible to seated passengers) to provide more room for passengers, that the non-passenger facing bottom portion of the seat will face towards the side walls of the vehicle cabin 150 and away from passengers inside the vehicle cabin 150. In this way, passengers can enjoy the greater comfort and safety that results from not being exposed to unsightly and rough surfaces of seats.

In some embodiments, determining that only the one or more passenger facing portions of each of the one or more seats will be visible to one or more passengers of the vehicle can be performed as part of determining a configuration of the one or more seats based at least in part on the occupancy data and the one or more states of the vehicle as described in 806 of the method 800 that is depicted in FIG. 8.

At 908, the method 900 can include determining one or more locations of the one or more seats in the vehicle based at least in part on the order in which the one or more passengers or cargo will enter and/or exit the vehicle. For example, the vehicle computing system 112 can determine that the one or more seats in the rear portion of the vehicle cabin 150 will be grouped to allow a first set of passengers easier access to the one or more seats 152/154 in the front portion of the vehicle cabin 150. The vehicle computing system 112 can then ungroup the one or more seats 152/154 in the rear of the vehicle so that a second set of passengers can sit in the seats located in the rear portion of the vehicle cabin 150.

In some embodiments, determining one or more locations of the one or more seats in the vehicle based at least in part on the order in which the one or more passengers or cargo will enter and/or exit the vehicle can be performed as part of determining a configuration of the one or more seats based at least in part on the occupancy data and the one or more states of the vehicle as described in 806 of the method 800 that is depicted in FIG. 8.

At 910, the method 900 can include determining that the one or more passengers and/or cargo that will exit the vehicle earlier are assigned to the one or more seats in greater proximity to the at least one entrance than the one or more passengers or cargo that will exit the vehicle later. For example, when three passengers Dominica, Elijah, and Francis will exit a vehicle with a single entrance, in an order starting with Dominica and ending with Francis, Francis can be assigned to a seat furthest from the entrance 158 of the vehicle 108, Elijah can be assigned to next seat closest seat to the entrance, and Dominica can be seated further away from the entrance than Elijah or Francis.

In some embodiments, determining that the one or more passengers and/or cargo that will exit the vehicle earlier are assigned to the one or more seats in greater proximity to the at least one entrance than the one or more passengers or cargo that will exit the vehicle later can be performed as part of determining a configuration of the one or more seats based at least in part on the occupancy data and the one or more states of the vehicle as described in 806 of the method 800 that is depicted in FIG. 8.

Figure 10:
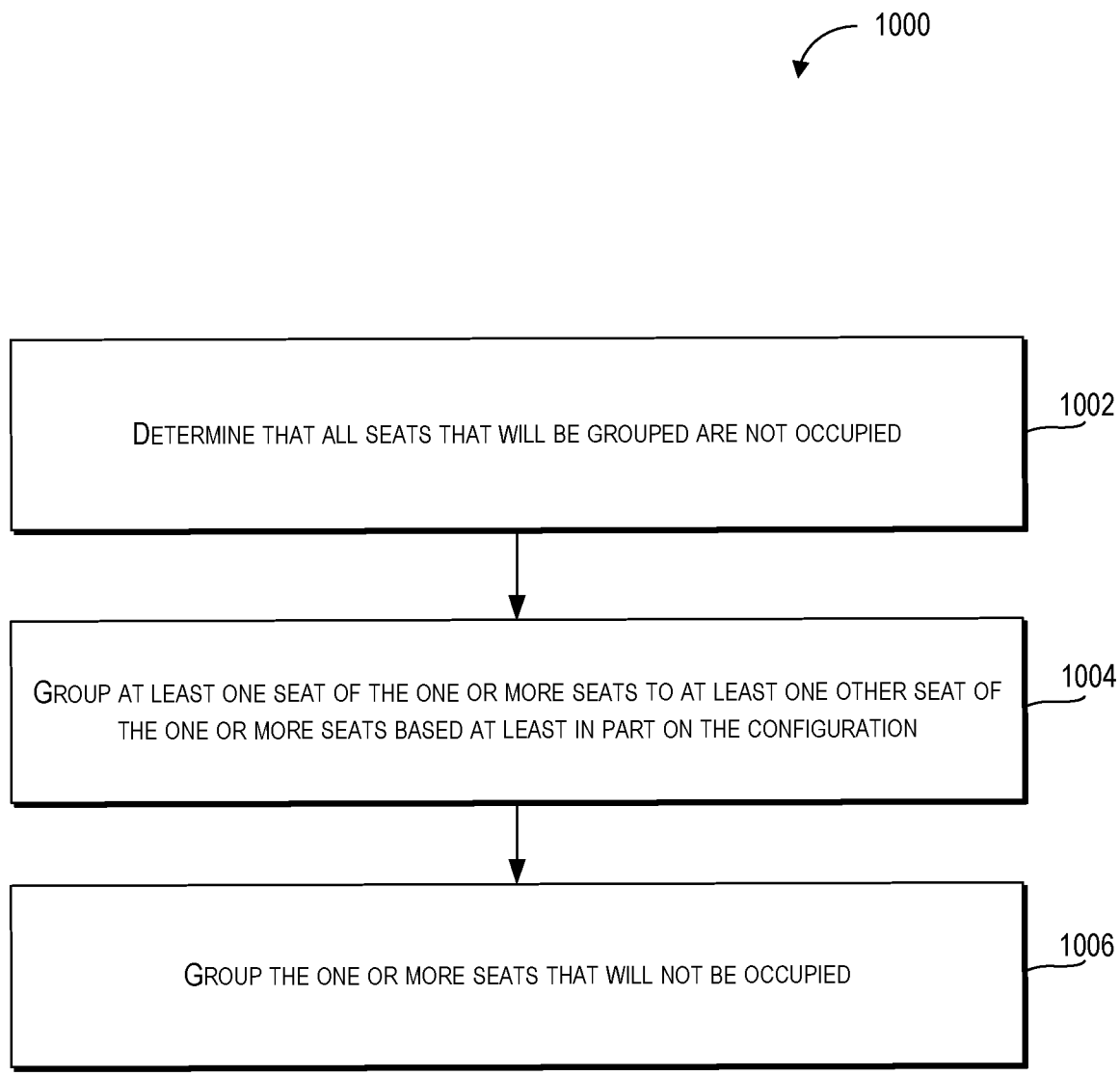
FIG. 10 depicts a flow diagram of an example method of configuring vehicle seats according to example embodiments of the present disclosure.

FIG. 10 depicts a flow diagram of an example method of configuring vehicle seats according to example embodiments of the present disclosure. One or more portions of a method 1000 can be implemented by one or more devices (e.g., one or more computing devices) or systems including, for example, the operations computing system 104, the vehicle 108, or the vehicle computing system 112, which are shown in FIG. 1. Moreover, one or more portions of the method 1000 can be implemented as an algorithm on the hardware components of the devices described herein (e.g., as in FIG. 1) to, for example, generate control signals to perform operations including adjusting seats associated with a vehicle. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In example embodiments, one or more portions of the method 1000 can be performed as part of the method 800 that is depicted in FIG. 8. Further, one or more portions of the method can be performed as part of adjusting at least one seat of the one or more seats based at least in part on the configuration as described in 810 of the method 800 that is depicted in FIG. 8.

At 1002, the method 1000 can include determining that all of the one or more seats that will be grouped are not occupied (e.g., occupied by one or more passengers and/or one or more articles of cargo). For example, the one or more sensors 114 of the vehicle 108 can be used to detect one or more objects (e.g., a passenger and/or an article of cargo) that block grouping of any seat of the one or more seats. When, the vehicle computing system 112 determines that one or more objects are blocking and/or preventing grouping of the one or more seats 152/154, the vehicle computing system 112 can determine that the one or more seats 152/154 will not be grouped. By way of further example, one or more motors of the one or more seats 152/154 and/or the seat interface 156 can be configured to stop or reverse movement in a particular direction when any resistance to the movement of the one or more seats 152/154 is detected. By way of further example, the vehicle computing system 112 can be configured not to adjust the configuration of the one or more seats when any passengers and/or cargo are present in the vehicle (e.g., the vehicle computing system 112 will only adjust the one or more seats when the vehicle 108 is vacant). As such, the overall safety of operation of the vehicle can be improved by avoiding grouping of any seats that are occupied (e.g., occupied by a passenger).

In some embodiments, determining that all of the one or more seats that will be grouped are not occupied can be performed as part of adjusting at least one seat of the one or more seats based at least in part on the configuration as described in 810 of the method 800 that is depicted in FIG. 8.

At 1004, the method 1000 can include grouping at least one seat of the one or more seats to at least one other seat of the one or more seats based at least in part on the configuration. For example, the vehicle computing system 112 can generate one or more control signals and/or data based at least in part on the configuration. The one or more control signals and/or data can be used to activate one or more motors of the seat interface 156 and/or the one or more seats 152/154 that can cause a portion (e.g., two of six seats) of the one or more seats 152/154 to fold a bottom seating area downwards and be grouped together (e.g., moved together) in a rear portion of the vehicle cabin 150.

In some embodiments, grouping at least one seat of the one or more seats to at least one other seat of the one or more seats based at least in part on the configuration can be performed as part of adjusting at least one seat of the one or more seats based at least in part on the configuration as described in 810 of the method 800 that is depicted in FIG. 8.

At 1006, the method 1000 can include grouping the one or more seats that will not be occupied. For example, in a vehicle with four seats, when the occupancy data indicates that two seats of the one or more seats 152 will be occupied and that two seats of the one or more seats 152 will not be occupied, the vehicle computing system 112 can group the two seats that will not be occupied. In this way, by grouping two seats the two seated passengers of the vehicle 108 can enjoy a greater amount of free space around their respective seats. Further, in some embodiments, grouping the one or more seats that will not be occupied can include grouping the one or more seats in accordance with a default grouping configuration. For example, the vehicle computing system 112 can access data associated with a default grouping configuration and group the one or more seats accordingly. The default grouping configuration can include various configurations including grouping the one or more seats that will not be occupied into a particular location in the vehicle (e.g., group the one or more seats that will not be occupied to the front portion of the vehicle cabin 150 and/or a rear portion of the vehicle cabin 150).

In some embodiments, grouping the one or more seats that will not be occupied can be performed as part of adjusting at least one seat of the one or more seats based at least in part on the configuration as described in 810 of the method 800 that is depicted in FIG. 8.

Figure 11:
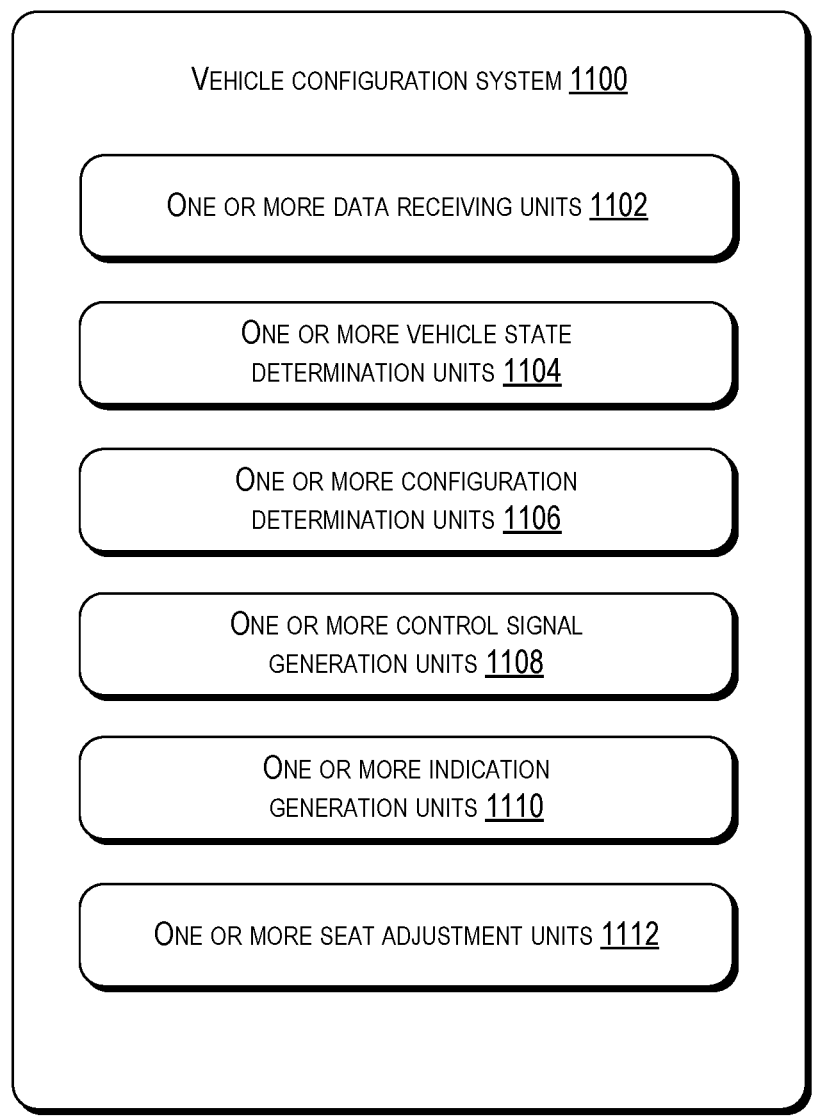
FIG. 11 depicts an example of a vehicle configuration system according to example embodiments of the present disclosure.

FIG. 11 depicts an example of a vehicle configuration system according to example embodiments of the present disclosure. A vehicle configuration system 1100 that is depicted in FIG. 11 can perform and/or implement one or more operations and/or functions of one or more devices (e.g., one or more computing devices) and/or systems including, for example, the operations computing system 104, the vehicle 108, or the vehicle computing system 112, depicted in FIG. 1. Further, the one or more devices and/or systems in FIG. 11 can include one or more features of one or more devices and/or systems including, for example, the operations computing system 104, the vehicle 108, or the vehicle computing system 112, which are depicted in FIG. 1.

As illustrated, FIG. 11 shows a vehicle configuration system 1100 including one or more data receiving units 1102, one or more vehicle state determination units 1104, one or more configuration determination units 1106, one or more control signal generation units 1108, one or more indication generation units 1110, one or more seat adjustment units 1112, and/or other means for performing the operations and functions described herein. In some implementations, one or more of the units may be implemented separately. In some implementations, one or more units may be a part of, or included in, one or more other units. These means can include one or more processors, one or more microprocessors, one or more central processing units, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, including random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a vehicle configuration system) or configured (e.g., an ASIC custom designed and configured to operate a vehicle configuration system) to perform one or more algorithms for performing the operations and functions described herein. For example, the means (e.g., the one or more data receiving units 1102) can be configured to receive occupancy data that includes information associated with occupancy of a vehicle that has an interior (e.g., the vehicle cabin 150 that is depicted in FIG. 1) including one or more seats (e.g., the one or more seats 152/154 that are depicted in FIG. 1).

Furthermore, the means (e.g., the one or more vehicle state determination units 1104) can be configured to determine one or more states of a vehicle (e.g., the vehicle cabin 150 of the vehicle 108 including the one or more seats 152/154 and/or the seat interface 156).

Furthermore, the means (e.g., the one or more configuration determination units 1106) can be configured to determine a configuration of one or more seats based at least in part on occupancy data and one or more states of the vehicle. In some implementations, the means (e.g., the one or more configuration determination units 1106) can be configured to determine one or more locations of the one or more seats with respect to a seat interface. Further, in some implementations, the means (e.g., the one or more configuration determination units 1106) can be configured to determine one or more locations of the one or more seats in the vehicle based at least in part on the order in which the one or more passengers or cargo will enter or exit the vehicle. In some implementations, the means (e.g., the one or more configuration determination units 1106) can also be configured to determine that the one or more passengers or cargo that will exit the vehicle earlier are assigned to the one or more seats in greater proximity to the at least one entrance than the one or more passengers or cargo that will exit the vehicle later. In some implementations, the means (e.g., the one or more configuration determination units 1106) can also be configured to determine, based at least in part on the occupancy data, one or more portions of the one or more seats that will be visible to one or more passengers of the vehicle. In some implementations, the means (e.g., the one or more configuration determination units 1106) can also be configured to determine that only the one or more passenger facing portions of each of the one or more seats will be visible to the one or more passengers of the vehicle.

Furthermore, the means (e.g., the one or more control signal generation units 1108) can be configured to generate one or more control signals to adjust the one or more states of the interior of the vehicle based at least in part on the configuration.

Further, in some implementations the means (e.g., the one or more indication generation units 1110) can be configured to generate one or more seating indications associated with a seating status of each of the one or more seats based at least in part on the configuration.

Furthermore, the means (e.g., the one or more seat adjustment units 1112) can be configured to adjust one or more seats based at least in part on the configuration.

Figure 12:
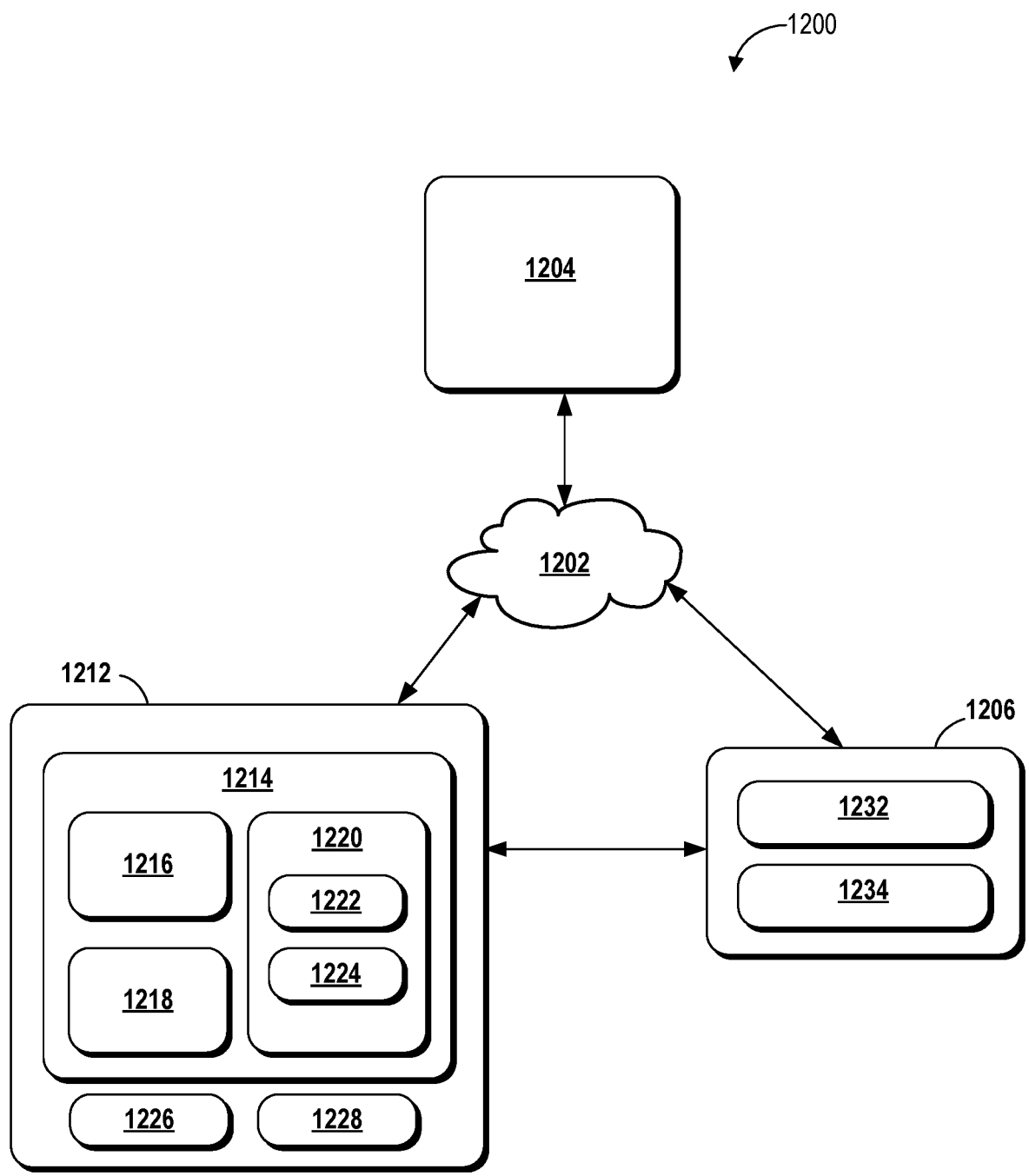
FIG. 12 depicts a diagram of an example system according to example embodiments of the present disclosure.

FIG. 12 depicts a diagram of an example system according to example embodiments of the present disclosure. A system 1200 can include a network 1202 which can include one or more features of the communications network 102 depicted in FIG. 1; an operations computing system 1204 which can include one or more features of the operations computing system 104 depicted in FIG. 1; one or more remote computing devices 1206 which can include one or more features of the one or more remote computing devices 106 depicted in FIG. 1; a vehicle computing system 1212 which can include one or more features of the vehicle computing system 112 depicted in FIG. 1; one or more computing devices 1214; a communication interface 1216; one or more processors 1218; one or more memory devices 1220; memory system 1222; memory system 1224; one or more input devices 1226; one or more output devices 1228; one or more input devices 1232; and one or more output devices 1234.

The vehicle computing system 1212 can include the one or more computing devices 1214. The one or more computing devices 1214 can include one or more processors 1218 which can be included on-board a vehicle including the vehicle 108 and one or more memory devices 1220 which can be included on-board a vehicle including the vehicle 108. The one or more processors 1218 can be any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 1218 can include a single processor or a plurality of processors that are operatively and/or selectively connected. The one or more memory devices 1220 can include one or more non-transitory computer-readable storage media, including RAM, ROM, EEPROM, EPROM, flash memory devices, magnetic disks, and/or combinations thereof.

The one or more memory devices 1220 can store data or information that can be accessed by the one or more processors 1218. For instance, the one or more memory devices 1220 which can be included on-board a vehicle (e.g., the vehicle 108), can include a memory system 1222 that can store computer-readable instructions that can be executed by the one or more processors 1218. The memory system 1222 can include software written in any programming language that can be implemented in hardware (e.g., computing hardware). Further, the memory system 1222 can include instructions that can be executed in logically and/or virtually separate threads on the one or more processors 1218. The memory system 1222 can include any set of instructions that when executed by the one or more processors 1218 cause the one or more processors 1218 to perform operations.

For example, the one or more memory devices 1220, which can be included on-board a vehicle (e.g., the vehicle 108 that is depicted in FIG. 1), can store instructions, including specialized instructions, that when executed by the one or more processors 1218 on-board the vehicle cause the one or more processors 1218 to perform operations including any of the operations and/or functions of the one or more computing devices 1214 or for which the one or more computing devices 1214 are configured, including the operations for receiving occupancy data including information associated with occupancy of a vehicle (e.g., the vehicle 108 that is depicted in FIG. 1) that includes one or more seats (e.g., the one or more seats 154 that are depicted in FIG. 1); determining one or more states of the vehicle in which the one or more states of the vehicle can include a disposition of any object within the vehicle; determining a configuration of the one or more seats based at least in part on the occupancy data and the one or more states of the vehicle, in which the configuration can include a disposition of the one or more seats inside the vehicle; adjusting at least one seat of the one or more seats based at least in part on the configuration, and/or any other operations and/or functions for operation of a vehicle, as described in the present disclosure.

The one or more memory devices 1220 can include a memory system 1224 that can store data that can be retrieved, manipulated, created, and/or stored by the one or more computing devices 1214. The data stored in memory system 1224 can include, for instance, sensor data associated with a vehicle including the vehicle 108; occupancy data (e.g., the occupancy data described in the method 800 that is depicted in FIG. 8) including data associated with one or more objects (e.g., passengers and/or cargo) that can be placed in the vehicle 108; data associated with user input; data associated with one or more actions and/or control command signals; data associated with users; and/or other data or information. The data in the memory system 1224 can be stored in one or more databases. The one or more databases can be split up so that they are located in multiple locales on-board a vehicle which can include the vehicle 108. In some implementations, the one or more computing devices 1214 can obtain data from one or more memory devices that are remote from a vehicle, which can include the vehicle 108.

The system 1200 can include the network 1202 (e.g., a communications network) which can be used to exchange (send or receive) signals (e.g., electronic signals) or data (e.g., data from a computing device) including signals or data exchanged between computing devices including the operations computing system 1204, the one or more remote computing devices 1206, and/or the vehicle computing system 1212. The network 1202 can include any combination of various wired (e.g., twisted pair cable) and/or wireless communication mechanisms (e.g., cellular, wireless, satellite, microwave, and radio frequency) and/or any desired network topology (or topologies). For example, the communications network 1202 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 1214 can also include the communication interface 1216 used to communicate with one or more other systems which can be included on-board a vehicle including the vehicle 108 (e.g., over the network 1202). The communication interface 1216 can include any suitable components for interfacing with one or more networks, including for example, transmitters, receivers, ports, controllers, antennas, other hardware and/or software.

The vehicle computing system 1212 can also include one or more input devices 1226 and/or one or more output devices 1228. The one or more input devices 1226 and/or the one or more output devices 1228 can be included and/or otherwise associated with a human-machine interface system. The one or more input devices 1226 can include, for example, hardware for receiving information from a user, including a touch screen, touch pad, keyboard, mouse, data entry keys, speakers, and/or a microphone suitable for voice recognition. The one or more output devices 1228 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices and the audio output devices.

The one or more remote computing devices 1206 can include various types of computing devices. For example, the one or more remote computing devices 1206 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more remote computing devices 1206 can be associated with a user. The one or more remote computing devices 1206 described herein can also be representative of a user device that can be included in the human machine interface system of a vehicle including the vehicle 108.

The one or more remote computing devices 1206 can include one or more input devices 1232 and/or one or more output devices 1234. The one or more input devices 1232 can include, for example, hardware for receiving information from a user (e.g., a touch screen, touch pad, mouse, data entry keys, speakers, and/or a microphone suitable for voice recognition). The one or more output devices 1234 can include hardware for providing content for display. For example, the one or more output devices 1234 can include a display device (e.g., display screen, CRT, LCD), which can include hardware for a user interface.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A vehicle comprising:
   one or more seats;
   one or more processors;
   a memory comprising one or more computer-readable media, the memory storing computer-readable instructions that when executed by the one or more processors cause the one or more processors to perform operations comprising:
      receiving occupancy data comprising information associated with occupancy of the vehicle;
      determining one or more states of the vehicle, wherein the one or more states of the vehicle comprise a disposition of any object within the vehicle;
      determining a configuration of the one or more seats based at least in part on the occupancy data and the one or more states of the vehicle, wherein the configuration comprises a disposition of the one or more seats inside the vehicle; and
      in response to determining that the vehicle is vacant, automatically adjusting at least one seat of the one or more seats based at least in part on the configuration.

2. The vehicle of claim 1, wherein the vehicle comprises a seat interface to which the one or more seats are connected, and wherein at least one of the one or more seats is attachable to the seat interface or detachable from the seat interface.

3. The vehicle of claim 2, wherein the seat interface is configured to enable movement of the one or more seats to one or more different locations in the vehicle, and wherein the seat interface comprises one or more tracks, one or more rails, or one or more magnetic regions that attract one or more ferromagnetic portions of the one or more seats.

4. The vehicle of claim 2, wherein at least two seats of the one or more seats are on a track of the seat interface and are configured to be grouped together by moving at least one seat of the at least two seats along the track of the seat interface.

5. The vehicle of claim 2, wherein the occupancy data comprises a layout of the one or more seats in the vehicle and wherein determining based at least in part on the occupancy data and the one or more states of the vehicle, the configuration of the one or more seats comprises:
   determining one or more locations of the one or more seats with respect to the seat interface based at least in part on the occupancy data comprising the layout of the one or more seats in the vehicle.

6. The vehicle of claim 1, wherein at least one of the one or more seats is configured to be grouped with at least one other seat of the one or more seats.

7. The vehicle of claim 6, wherein automatically adjusting the at least one seat of the one or more seats based at least in part on the configuration comprises:
   grouping the at least one seat of the one or more seats to at least one other seat of the one or more seats based at least in part on the configuration.

8. The vehicle of claim 6, wherein the occupancy data comprises a number of the one or more seats that will not be occupied and adjusting the at least one seat of the one or more seats based at least in part on the configuration comprises:
   grouping the one or more seats that will not be occupied based at least in part on the configuration.

9. The vehicle of claim 1, wherein the configuration of the one or more seats comprises a location of at least one of the one or more seats in the vehicle, an orientation of at least one of the one or more seats with respect to the vehicle, or a seating position of at least one of the one or more seats.

10. The vehicle of claim 1, further comprising:
    generating based at least in part on the configuration, one or more seating indications associated with a seating status of at least one of the one or more seats, wherein the one or more seating indications comprises one or more visual indications, one or more audible indications, or one or more haptic indications.

11. The vehicle of claim 10, wherein the one or more visual indications are displayed on one or more areas of the one or more seats, and wherein the one or more visual indications comprise illumination of the one or more areas of the one or more seats, one or more textual messages displayed on the one or more areas of the one or more seats, or one or more colors displayed on the one or more areas of the one or more seats.

12. The vehicle of claim 1, wherein the occupancy data comprises an order in which one or more passengers or cargo will enter or exit the vehicle.

13. The vehicle of claim 12, wherein determining based at least in part on the occupancy data and the one or more states of the vehicle, a configuration of the one or more seats comprises:
    determining one or more locations of the one or more seats in the vehicle based at least in part on the order in which the one or more passengers or cargo will enter or exit the vehicle.

14. The vehicle of claim 12, wherein the vehicle comprises at least one entrance into the vehicle, and wherein determining based at least in part on the occupancy data and the one or more states of the vehicle, the configuration of the one or more seats comprises:
    determining that the one or more passengers or cargo that will exit the vehicle earlier are assigned to the one or more seats in greater proximity to the at least one entrance than the one or more passengers or cargo that will exit the vehicle later.

15. A computer-implemented method of operating a vehicle, the computer-implemented method comprising:
    receiving occupancy data comprising information associated with occupancy of a vehicle, wherein the vehicle comprises one or more seats;
    determining one or more states of the vehicle, wherein the one or more states of the vehicle comprise a disposition of any object within the vehicle;
    determining a configuration of the one or more seats based at least in part on the occupancy data and the one or more states of the vehicle, wherein the configuration comprises a disposition of the one or more seats inside the vehicle; and
    in response to determining that the vehicle is vacant, automatically adjusting at least one seat of the one or more seats based at least in part on the configuration.

16. The computer-implemented method of claim 15, wherein adjusting the at least one seat of the one or more seats based at least in part on the configuration comprises:
adjusting a location, an orientation, or a seating position of at least one seat of the one or more seats, wherein the seating position comprises a height of the at least one seat with respect to the vehicle, an angle of a seat back portion of the at least one seat, a height of an armrest portion of the at least one seat, or a height of a headrest portion of the at least one seat.

17. The computer-implemented method of claim 15, wherein at least one of the one or more seats comprises one or more passenger facing portions and one or more non-passenger facing portions, and wherein determining the configuration of the one or more seats based at least in part on the occupancy data and the one or more states of the vehicle comprises:
determining based at least in part on the occupancy data, one or more portions of the one or more seats that will be visible to one or more passengers of the vehicle, wherein the occupancy data comprises a seating assignment for the one or more passengers; and
determining that only the one or more passenger facing portions of at least one of the one or more seats will be visible to the one or more passengers of the vehicle.

18. A computing device comprising:
one or more processors;
a memory comprising one or more computer-readable media, the memory storing computer-readable instructions that when executed by the one or more processors cause the one or more processors to perform operations comprising:
receiving occupancy data comprising information associated with occupancy of a vehicle, wherein the vehicle comprises one or more seats;
determining one or more states of the vehicle, wherein the one or more states of the vehicle comprise a disposition of any object within the vehicle;
determining a configuration of the one or more seats based at least in part on the occupancy data and the one or more states of the vehicle, wherein the configuration comprises a disposition of the one or more seats inside the vehicle; and
in response to determining that the vehicle is vacant, automatically adjusting at least one seat of the one or more seats based at least in part on the configuration.

19. The computing device of claim 18, wherein the occupancy data comprises information associated with one or more seat configurations of a seat of the one or more seats associated with a passenger, and wherein the one or more seat configurations comprise a seat height, a seat headrest height, a seat back angle, or an accessibility status.

20. The computing device of claim 18, wherein the one or more seats comprise one or more barriers configured to reduce access to the at least one seat.

* * * * *